(12) United States Patent
Anderson

(10) Patent No.: US 8,446,413 B2
(45) Date of Patent: *May 21, 2013

(54) COMPUTER IMPLEMENTED METHODS FOR GENERATING ENGRAVED IMAGES FOR WORKS OF ART

(75) Inventor: Dean Robert Gary Anderson, Orem, UT (US)

(73) Assignee: Dean Robert Gary Anderson as Trustee of the D/L Anderson Family Trust, Orem, UT (US)

( * ) Notice: Subject to any disclaimer, the term of this patent is extended or adjusted under 35 U.S.C. 154(b) by 1229 days.

This patent is subject to a terminal disclaimer.

(21) Appl. No.: 12/125,765

(22) Filed: May 22, 2008

(65) Prior Publication Data

US 2008/0292218 A1    Nov. 27, 2008

Related U.S. Application Data

(60) Provisional application No. 60/931,462, filed on May 23, 2007.

(51) Int. Cl.
*G06T 11/20* (2006.01)

(52) U.S. Cl.
USPC .......................................................... 345/441

(58) Field of Classification Search
USPC ........................................ 345/589, 581, 441
See application file for complete search history.

(56) References Cited

U.S. PATENT DOCUMENTS

| | | | | |
|---|---|---|---|---|
| 5,546,091 A * | 8/1996 | Haugen et al. | ................ | 342/181 |
| 5,602,972 A | 2/1997 | Hada et al. | | |
| 5,847,712 A * | 12/1998 | Salesin et al. | ................ | 345/582 |
| 5,872,573 A * | 2/1999 | Adegeest | ................ | 345/621 |
| 5,991,438 A * | 11/1999 | Shaked et al. | ................ | 382/162 |
| 6,067,073 A * | 5/2000 | Rae-Smith et al. | ........... | 345/589 |
| 6,226,000 B1 | 5/2001 | Richens et al. | | |
| 6,345,104 B1 | 2/2002 | Rhoads | | |
| 6,404,419 B1 | 6/2002 | Nagashima | | |
| 6,422,037 B1 | 7/2002 | Benderly | | |
| 6,552,731 B1 | 4/2003 | Gonsalves | | |
| 6,637,851 B2 | 10/2003 | Velde et al. | | |
| 6,750,986 B1 * | 6/2004 | Yang | ................ | 358/462 |
| 6,834,434 B2 | 12/2004 | Nelson | | |
| 7,093,368 B1 | 8/2006 | Nelson | | |
| 7,126,723 B1 | 10/2006 | Yamamoto | | |
| 7,274,372 B1 * | 9/2007 | Lake et al. | ................ | 345/582 |
| 7,275,484 B2 | 10/2007 | Franz et al. | | |

(Continued)

OTHER PUBLICATIONS

Ostromoukhov; "Digital Facial Engraving," Victor Ostromoukhov, ACM, SIGGRAPH '99, Los Angeles, CA, May 1999, Proceedings published Jul. 1999, pp. 417-424.*

(Continued)

*Primary Examiner* — Edward Martello
(74) *Attorney, Agent, or Firm* — Morris O'Bryant Compagni, PC

(57) ABSTRACT

A method of producing an engraved image on a computer screen includes loading an image to be engraved and converting the image into a high contrast image using at least two colors. The first lighter color is used for the lighter portions of the high contrast image and a darker color is used for the darker portions of the high contrast image. Mixing of the colors is based on the luminance level of the image. A plurality of lines are drawn over the high contrast image with variations in the plurality of lines drawn being a function of the luminance of the underlying image.

20 Claims, 25 Drawing Sheets

U.S. PATENT DOCUMENTS

| | | | |
|---|---|---|---|
| 2005/0003870 A1* | 1/2005 | Nakano et al. | 455/575.1 |
| 2006/0077471 A1 | 4/2006 | Wang | |
| 2006/0284872 A1* | 12/2006 | Brown Elliott | 345/426 |
| 2007/0010753 A1* | 1/2007 | MacAdam | 600/523 |

OTHER PUBLICATIONS

Shinji Mizuno et al.; "Virtual Sculpting with a Pressure Sensitive Pen," SIGGRAPH 2003, ACM Jul. 2003; Sketches & Applications, p. 1.*

Alexei Souring; "Functionally Based Virtual Computer Art," Mar. 2001 ACM, I3D 2001, Research Triangle Park, NC USA; pp. 77-85.*

*DesKAM CNC Home.* Apr. 30, 2009. DesKAM. <http://www.deskam.com/ p. 1.

"Carken Products: Desk Engrave." *DesKAM CNC.* Apr. 30, 2009. DesKAM.

"DesKAM Support." *DesKAM CNC.* Apr. 30, 2009. DesKAM. Downloads. *DesKAM CNC.* Apr. 30, 2009. DesKAM.

"Desk Engrave." *DesKAM CNC.* Apr. 30, 2009. DesKAM.

"DeskCNC." *DesKAM CNC.* Apr. 30, 2009. DesKAM. <http://www.deskcnc.com.

*MTC Home.* Apr. 30, 2009. Machine Tool Camp.

"DIY CNC Routers." *Machine Tool Camp.* Apr. 30, 2009.

"Flagship CNC Routers." *Machine Tool Camp.* Apr. 30, 2009.

"Overview." *Camtronics, Inc.* Apr. 30, 2009.

*Camtronics, Inc.* Apr. 30, 2009. <http://www.seanel.com/~dmauch/Products2.htm.

"Secrets 2." *Camtronics, Inc.* Apr. 30, 2009.

"Glossary." *Camtronics, Inc.* Apr. 30, 2009.

"Links." *Camtronics, Inc.* Apr. 30, 2009.

"Images." *Camtronics, Inc.* Apr. 30, 2009.

*HobbyCNC—CNC Kits, Plans, Stepper Motors, Foam Cutting.* Apr. 30, 2009.

"Products." *HobbyCNC—CNC Kits, Plans, Stepper Motors, Foam Cutting.* Apr. 30, 2009.

"CNC Machines." *Mars Enterprises: Centroid's Regional uthorized Dealer: Industry's Best CNC Controls.* Apr. 30, 2009. <http://www.marsenip.com/cnc-machines.htm p. 1.

"Rutex, USA." *Rutex . . . a step ahead . . .* Apr. 30, 2009.

"Pantografi fresatrici CNC, Robotica e Automazione." Apr. 30, 2009. *RM Engineering Ronchini S.A.S.* <http://www.ronchinimassimo.com/ pp. 1-7.

"Discount Tools. Cutting Tools, Abrasives." *Discount-Tools.com.* Apr. 30, 2009.

"End Mills, Burrs, Carbide Router Bits." *American-Carbide.com: Your Online Cutting.*

"Low-Cost Die Cutting Services & Custom Laser by Mag-Knight." *Mag-Knight Low-Cost Die Cutting Custom Services.* Apr. 30, 2009. <http://www.mag-knight.com/diecutting/pp. 1-2.

"Welcome to Cad Cam Information Portal." *Cad Cam & CNC Resources.* Apr. 30, 2009.

"Welcome to Our Hobby Site."*Majosoft's Hobby Site.* Apr. 30, 2009.

Benson, David. "Easy CNC: A Beginner's Guide to CNC." 2008. Apr. 30, 2009.

"ACME—Coyote Edition 6.0.0.0." *Filebasket.* Apr. 30, 2009

"PhotoV Carve Overview."*Vectric.* Apr. 30, 2009. <http://www.vectric.com/WebSite/Vectric/pvc/pvc_index.htm> p. 1.

"PhotoV Carve—Features." Vectric. Apr. 30, 2009.

"Fantastic Lithophanes." *Vectric.* Apr. 30, 2009. pp. 1-3.

"Useful Links." *Vectric.* Apr. 30, 2009.

"Engraving." *Wikipedia: The Free Encyclopedia*, pp. 1-4. Sep. 9, 2008. <http://en.wikipedia.org/wiki/Engraving>.

"Intaglio (printmaking)." *Wikipedia: The Free Encyclopedia*, pp. 1-3. Aug. 30, 2008. <http://en.wikipedia.org/wiki/Intaglio_(printmaking)>.

"List of Motiffs on Banknotes."*Wikipedia: The Free Encyclopedia*, pp. 1-13. Sep. 23, 2008. <http://en.wikipedia.org/wiki/List_of_motifs_on_banknotes>.

"Postage Stamp." *Wikipedia: The Free Encyclopedia*, pp. 1-5. Sep. 12, 2008. <http://en.wikipedia.org/wiki/Postage_stamp>.

"Screen-Printing." *Wikipedia: The Free Encyclopedia*, pp. 1-6. Sep. 25, 2008. <http://en.wikipedia.org/wiki/Silkscreen>.

Engraving Tools, Endmills & Cutters, Spring Loaded Engraving Tools, Vacuum Chucks for Workholding. Jun. 12, 2009. 2L Inc. <http://www.2linc.com/, pp. 1-4.

Mars Enterprises: Centroid's Regional Authorized Dealer: Industry's Best CNC Controls. Apr. 30, 2009. <http://www.marsentp.com/ p. 1.

"Retrofits." Mars Enterprises: Centroid's Regional Authorized Dealer: Industry's Best CNC Controls. Apr. 30, 2009. <http://www.marsentp.com/retrofits.htm p. 1.

"End Mills, Burrs, Carbide Router Bits." American-Carbide.com: Your Online Cutting Tool Source. Apr. 30, 2009. <http://www.american-carbide.com/> p. 1-2.

"Die Cut & Cutting Services by Mag-Knight Inc." Mag-Knight, Inc. Die Cut & Cutting Inc. Apr. 30, 2009 <http://www.die-cut.net/ pp. 1-2.

"CNC Parts Repair Exchange Spares Surplus @ CNC Electronics LLC." CNC Electronics, LLC. Apr. 30, 2009. <http://www.cnc-electronics.com/> p. 1.

"What's New in Aspire 2.0." Vectric: Passionate About CNC. pp. 1-51. Mar. 30, 2009.

"What's New in VCarve Pro 5.0." Vectric: Passionate About CNC. pp. 1-45. Mar. 30, 2009.

"Machining Lithophanes with Photo VCare." Vectric: Passionate About CNC. pp. 1-10. Mar. 30, 2009.

"Pen Scrappers." WTC Wacom Technology Home Page, p. 1. <http://www.wacom.com/index2.cfm> Sep. 25, 2008.

"Products." HobbyCNC—CNC Kits, Plans, Stepper Motors, Foam Cutting Apr. 30, 2009. <http://www.hobbycnc.com/products/, p. 1.

"Welcome to Cad Cam Information Portal." Cad Cam & CNC Resources. Apr. 30, 2009. <http://www.1st-in-cadcam.com/>, p. 1.

\* cited by examiner

Preferences for this Image

| Field | Value | |
|---|---|---|
| Image File Size: Pixels Width: | 2948 | Pixels Length: 4000 — The number of pixels in the original image file. |
| Output Size: Width (inches): | 8.00 | Length (inches): 10.85 — You determine the final size of the output image. |
| Width (cm): | 20.32 | Length (cm): 27.57 |
| Lines Per Inch (Lines/Inch): | 61.41667 | Calculated using: Lines Per Inch = Pixels Width/Output Width/Pixels Per Line [For Ref.: Dollar Bill = 128 Lines/Inch and Rebrandt/Dore' = 64 Lines/Inch] |
| Lines Per Centimeter (Lines/cm): | 24.17979 | |
| Pixels Per Line (Pixels/Line): [Maximum Black Width] | 6 | EngraveSoft allows you to set the Pixel Per Line to be between 2 and 31 Pixels/Line. [Note: Magnification in the zoom window is fixed to display individual pixels.] |
| Maximum White Width (Pixels/Line): | 6 | EngraveSoft allows you to set the Maximum White Line Width to be between Pixels Per Line and 31 Pixels/Line. A larger number than Pixels Per Line allows white space width to grow to Maximum White Width for lighter engraved lines. |
| Maximum Line Density Coverage: | 0.900 | Large areas of the darkest printing still require some white to preserve voids for ink. |
| Max/Min Line Width Ratio: | 10.000 | More engraving pressure results in a wider line. Ratio = Widest:Narrowest Lines. |
| Pixels Between Traced Lines: | 6 | Separation when tracing between parallel lines (not less than Pixels Per Line). [Note: This number is also used for the Error Condensation radius limit.] |
| Minimum Line Length (in Pixels): | 2 | The minimum line length in as measured in pixels (2 pixels minimum). |

EngraveSoft requires planning the final output prior to building the engraving files. Please review the data above.

[ OK ]   [ Cancel ]

*FIG. 32*

COMPUTER IMPLEMENTED METHODS FOR GENERATING ENGRAVED IMAGES FOR WORKS OF ART

CROSS-REFERENCE TO RELATED APPLICATION

The present application claims priority to and hereby incorporates by reference U.S. Provisional Patent Application Ser. No. 60/931,462 filed on May 23, 2007.

BACKGROUND

1. Field of the Invention

The present invention relates generally to printmaking engraving and more specifically to software for creating printmaking engraving.

2. The Prior Art

Engraving is the practice of incising a design onto a hard, flat surface, by cutting grooves into it. The result may be a decorative object in itself, as when silver or gold are engraved, or in art may provide an intaglio printing plate in printmaking of copper or another metal.

Traditional engravers use a hardened steel tool called a burin to cut the design into the surface, most traditionally a copper plate. Gravers come in a variety of shapes and sizes that yield different line types. The burin produces a unique and recognizable quality of line that is characterized by its steady, deliberate appearance and clean edges. The angle tint tool has a slightly curved tip that is commonly used in printmaking. Florentine liners are flat-bottomed tools with multiple lines incised into them, used to do fill work on larger areas. Flat gravers are used for doing fill work on letters, as well as most musical instrument engraving work. Round gravers are commonly used on silver to create bright cuts (also called bright-cut engraving), as well as other hard-to-cut metals such as nickel and steel. Burins are either square or elongated diamond-shaped and used for cutting straight lines. Other tools such as mezzotint rockers, roulets and burnishers are used for texturing effects.

Traditionally, engravers created darker areas by making an area of many very thin parallel lines (called hatching). When two sets of parallel line hatchings intersected each other for higher density, the resultant pattern was known as cross-hatching. The modern discipline of hand engraving survives largely in a few specialized fields. In most of industrial uses like production of Intaglio plates for commercial applications hand engraving was replaced with milling using CNC engraving/milling machines.

Another application of modern engraving is found in the printing industry. There, every day thousands of pages are engraved in rotogravure cylinders, typically a steel base with a copper layer of about 0.1 mm in which the image is transferred. After engraving, the image is protected with an approximately 6 μm chrome layer. Using this process the image will survive million plus copies in high speed printing presses.

Typically the image is created in some PDF-like format and enters a workflow where it is processed and automatically imposed to the huge printing cylinders. Today up to 192 pages can be engraved on the same cylinder. Since the cylinder serves to print one color, four cylinders are typically used to print one side of the substrate. Rotogravure has a major share in publication, packaging and decorative printing. Gravure cylinders are typically engraved digitally by a diamond tipped or laser etching machine.

Engraving machines such as the K500 (packaging) or K6 (publication) by Hell Gravure Systems use a diamond stylus to cut cells. Each cell creates one printing dot later in the process. A K6 can have up to 18 engraving heads each cutting 8.000 cells per second to an accuracy of 0.1 μm and below. They are of course fully computer controlled and the whole process of cylinder making is fully automated. Laser engraving machines are also in use.

Laser engraving is the practice of using lasers to engrave or mark an object (it is also sometimes incorrectly described as etching, which involves the use of acid or a similar chemical). The technique can be very technical and complex, and often a computer system is used to drive the movements of the laser head. Despite this complexity, very precise and clean engravings can be achieved at a high rate. The technique does not involve tool bits which contact the engraving surface and wear out. This is considered an advantage over alternative engraving technologies where bit heads have to be replaced regularly.

The impact of laser engraving has been more pronounced for specially-designed "laserable" materials. These include polymer and novel metal alloys.

A laser engraving machine can be thought of as three main parts: a laser, a controller, and a surface. The laser is like a pencil—the beam emitted from it allows the controller to trace patterns onto the surface. The controller (usually a computer) controls the direction, intensity, speed of movement, and spread of the laser beam aimed at the surface. The surface is picked to match what the laser can act on.

There are three main genres of engraving machines: The most common is the X-Y table where, usually, the work piece (surface) is stationary and the laser moves around in X and Y directions drawing vectors. Sometimes the laser is stationary and the work piece moves. Sometimes the work piece moves in the Y axis and the laser in the X axis. A second genre is for cylindrical work pieces (or flat work pieces mounted around a cylinder) where the laser effectively traverses a fine helix and on/off laser pulsing produces the desired image on a raster basis. In the third method, both the laser and work piece are stationary and galvo mirrors move the laser beam over the work piece surface. Laser engravers using this technology can work in either raster or vector mode.

The point where the laser (the terms "laser" and "laser beam" may be used interchangeably) touches the surface should be on the focal plane of the laser's optical system, and is usually synonymous with its focal point. This point is typically small, perhaps less than a fraction of a millimeter (depending on the optical wavelength). Only the area inside this focal point is significantly affected when the laser beam passes over the surface. The energy delivered by the laser changes the surface of the material under the focal point. It may heat up the surface and subsequently vaporize the material, or perhaps the material may fracture (known as "glass" or "glass up") and flake off the surface. This is how material is removed from the surface to create an engraving.

SUMMARY OF THE INVENTION

Accordingly, computer software is provided that facilitates the creation of engraved or woodcut appearing illustrative images. The software provides various features and tools that allow a user to create an engraved image from a preexisting digitized image. More specifically, the software allows a user to overlay the engraved image upon the digitized image in a manner that allows the user to create an accurate reproduction in engraved form of the digitized image.

A software program according to the present invention provides coordinated image views by allowing a single computer input, such as a key stroke or mouse, pen or stylus click to switch the computer image representation viewed on a monitor between a photo view, an engraved view, and a composite merged view, which merges and overlays the photo view and the engraved view. When switching between the views, the images are synchronized so that each image is displayed at the same zoom level and pan position. Thus, changing the zoom or pan on one image causes the same to be done for all images.

The software also provides visually distinguished image merging by utilizing color to distinguish the overlay views. As such, the original photographic image is displayed in the photo view in a manner in which the light areas of the image are displayed in a pale yellow color and the dark areas of the image are displayed in a deep blue color.

In another embodiment, each engraved line is displayed as a solid black line painted on a solid white background line of slightly larger width. The average value of the combined lines represents a corresponding luminance value for each point on the line.

In another embodiment, engraved lines are prevented from being made too small or too close together Thus, the dynamic range (white to black) of the luminance levels in an engraved image are restricted from about 95% (representing white) to about 5% (representing black).

In still another embodiment, the software automatically creates narrow lines in the lighter areas of the image and wider lines in the darker areas of the image. The pressure data for each point along the scribe line can be manually entered using pen pressure, pen tilt, or pen orientation. The pressure data can also be determined by the software, based on the unique luminance of each pixel over which the scribe line is drawn. Pressure data here corresponds to a pressure that a person would have to use in a downward fashion while holding an actual engraving tool while engraving an image on an engraving plate. The greater the pressure used with the cutting tool, the wider and deeper the mark and the more ink the mark will hold for transfer to the paper. Thus pressure corresponds ultimately to the width of the engraved line. This last approach is easiest and best for most scribe lines. Manual entry of data is also available but is best for creating points of focus in the engraving.

In yet another embodiment, the software provides one or more "brushes" to facilitate the creation of engraved or woodcut appearing illustrative images. For example, an "engrave and burnish" brush is provided to erase any previously engraved line under the affected area of a new engraved line. An "engrave between lines" brush provides engraving only where no other affected area of an engraved line exists. A "trace line" follows the affected area edge of a previously drawn line. "Masked area marking" allows a magic wand or masking brush to identify an area for engraved lines. Once masked, the software only allows engraved lines within the masked area.

The software provides for error condensation. Error condensation is essentially error diffusion, which is used in printing, in reverse. Instead of diffusing the quantization error when printing each pixel as is done in the error diffusion process, error condensation collects printing errors made by not engraving lines between other nearby engraved lines and including these errors in the "somewhat analog" calculated depth for each point on the engraved lines which are printed. These little gaps between engraved lines are visible in the merged view where portions of the pale yellow-blue luminescence image are still seen.

Thus, the software provides the tools necessary to produce engraved images that accurately portray digitized photographic images. In addition, each engraved image is individually created by the user such that no two engraved images will be exactly the same and allow the user to invoke his or her artistic talents into the creation of each engraved image. The software produces an engraved image and image data that can be utilized by existing engraving machines to produce an engraving on any capable medium.

The foregoing advantages and characterizing features will become apparent from the following description of certain illustrative embodiments of the invention. The above-described features and advantages of the present invention, as well as additional features and advantages, will be set forth or will become more fully apparent in the detailed description that follows and in the appended claims. The novel features which are considered characteristic of this invention are set forth in the attached claims. Furthermore, the features and advantages of the present invention may be learned by the practice of the invention, or will be obvious to one skilled in the art from the description, as set forth hereinafter.

BRIEF DESCRIPTION OF THE DRAWINGS

The following drawings illustrate exemplary embodiments for carrying out the invention. Like reference numerals refer to like parts in different views or embodiments of the present invention in the drawings.

FIG. 32 is a display window on a computer screen of a preferences dialog box for controlling certain parameters of the software in accordance with the principles of the present invention.

DETAILED DESCRIPTION OF THE INVENTION

Figure 1:
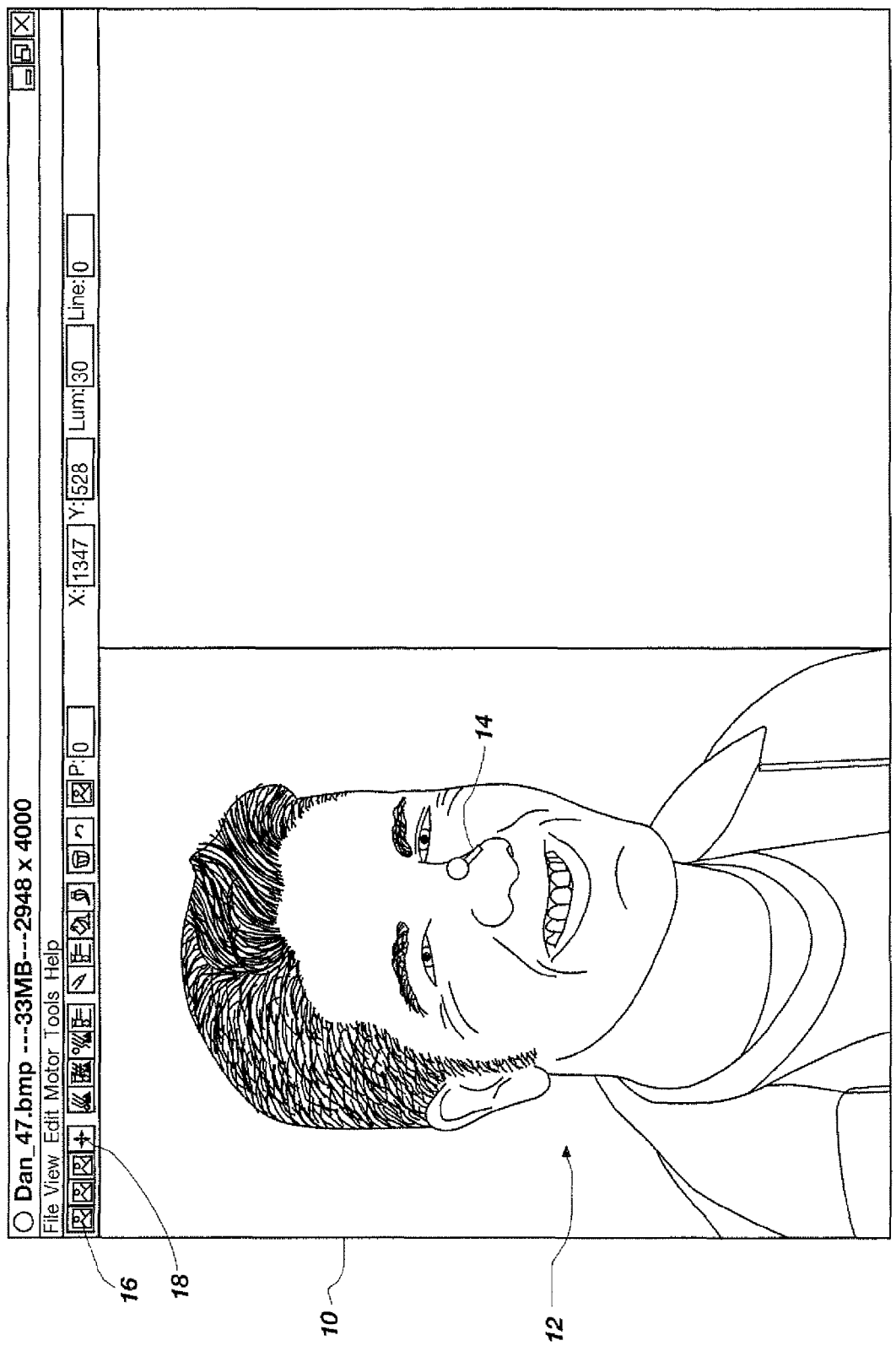
FIG. 1 is a display window on a computer screen showing a photo view of a subject for creating an engraved image in accordance with the principles of the present invention.

The following provides a detailed description of the invention for software for creating classical printmaking engravings. As illustrated in FIG. 1, a display window 10, as displayed on a computer monitor (not shown) displaying photo view of a digital image 12 is illustrated in which the image 12 has been loaded onto the computer and opened by software according to the principles of the present invention. The image 12 has been selected by a user in order to generate an engraved image thereof using the image 12 as the basis for the engraved image. When the image 12 is first opened, the software will display the image 12 in a zoomed-out state to show the entire image 12 as illustrated. The image 12 may be a color photograph or other image. Whenever the pointing device 14 is moved over the image 12, the cursor 14 automatically changes to a magnifying glass as shown. If the user clicks with a computer mouse or other computer input device, such as a pen or stylus, anywhere in the zoomed-out image 12, the software will automatically zoom-in on the image 12 at the pixel level and pan the zoomed-in display so that the image 12 is centered where the user clicked. The photo view of the image 12 is displayed whenever the user hits a particular computer key that is configured by the software to operate as a "hotkey," such as the 'F1' key, or if the user clicks on the first (left most) icon 16 using a pointing device in a window-based operating system, such as Microsoft Windows or Mac OS. The zoomed out view may be displayed anytime the user hits another hotkey, such as 'F4', or the user clicks on an icon 18, such as the fourth icon from the left.

Figure 2:
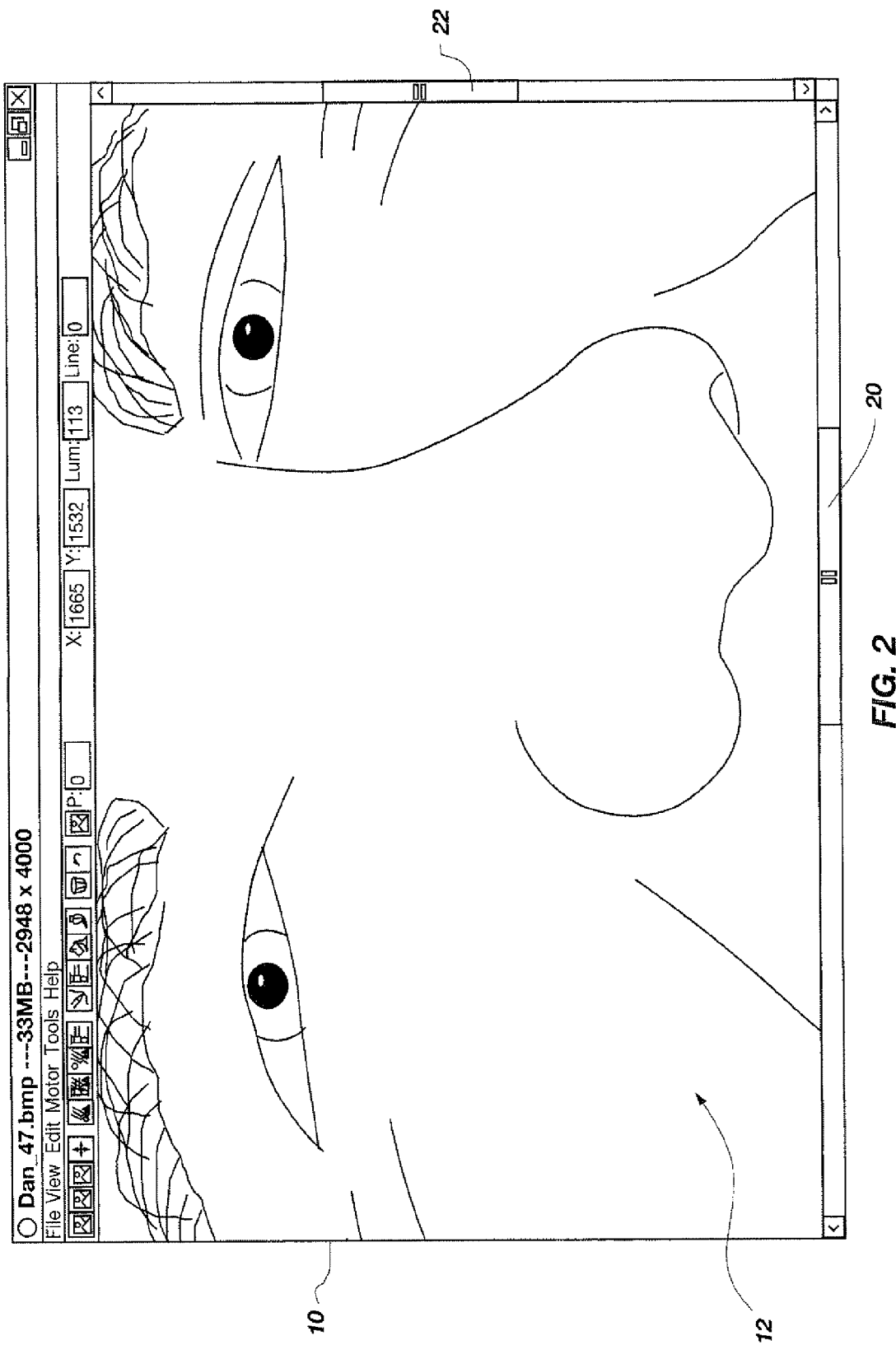
FIG. 2 is a display window on a computer screen showing a zoomed photo view of a subject for creating an engraved image in accordance with the principles of the present invention.

As illustrated in FIG. 2, when the user clicks on the image 12 shown in FIG. 1, e.g., on the bridge of the nose of the subject shown in FIG. 1, the software zooms in on the image 12 to magnify the image 12 to allow the image to be more easily converted into an engraved image. Thus, a zoomed in view of the photo view is displayed in color, if the image 12 was in color. Scroll bars 20 and 22 are provided to allow a user to pan the image within the display window 10.

Figure 3:
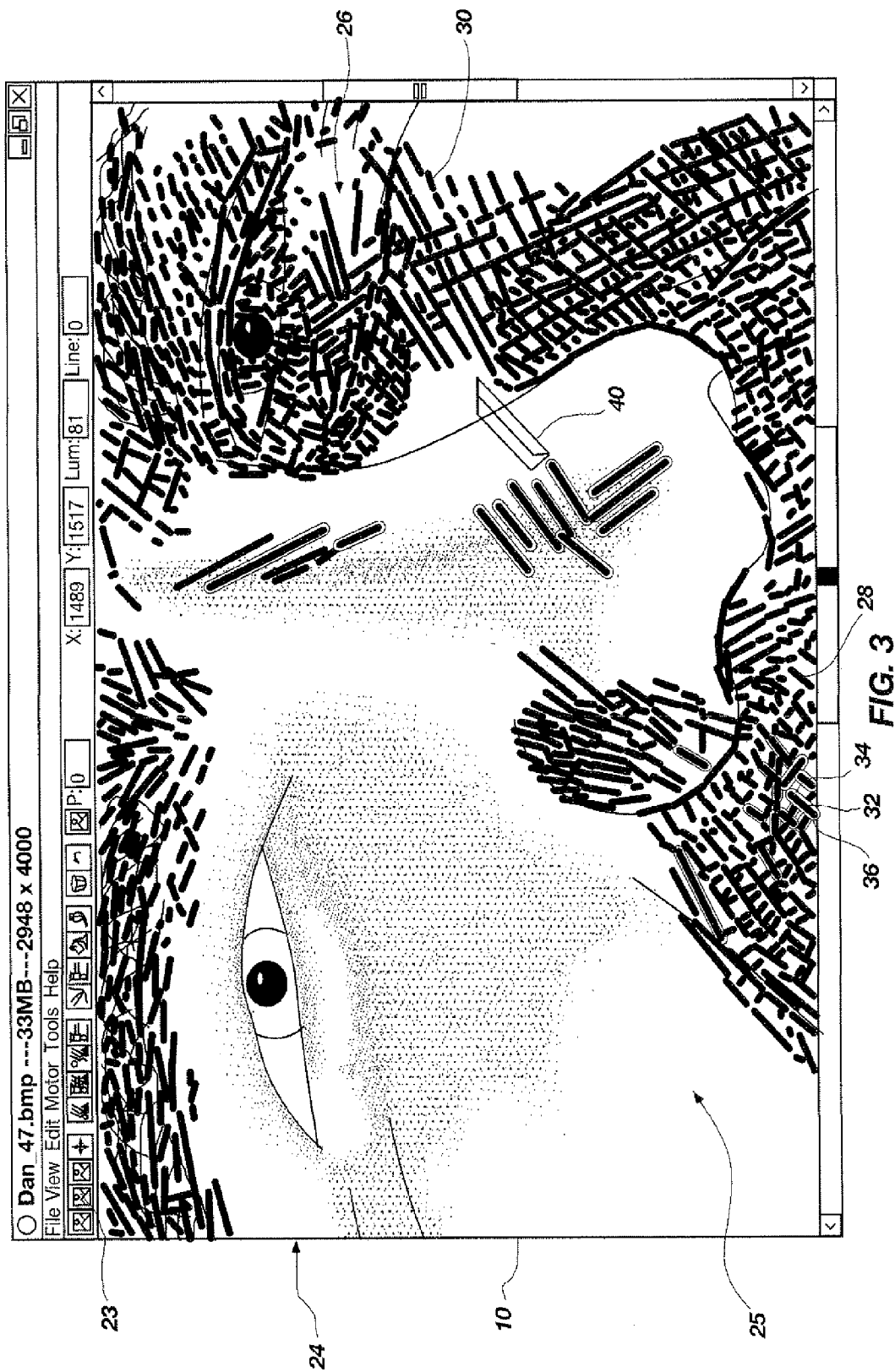
FIG. 3 is a display window on a computer screen showing a merged view when creating an engraved image in accordance with the principles of the present invention.

As shown in FIG. 3, when the user selects another hotkey, such as 'F2', or selects the second icon 23 at the upper left hand corner of the display window 10, the "merged view" is displayed. At first before any etched lines have been created, the merged view will be the same as FIG. 2, but with the darker areas 24 converted by the software to shades of blue and the lighter areas 26 converted by the software to shades of yellow. To do so, the RGB pixel values are set so that red equals green which equals the luminance level for the original photo and the blue value for all pixels is set to a fixed value equaling approximately forty-three percent of full blue. Because red and green account for approximately eighty-nine percent of the luminance variation in a RGB computer monitor displayed image, the corresponding luminance variations in the yellow-blue representation of the photo range from ninety-four percent luminance corresponding to the whitest parts of a photo view to five percent luminance corresponding to blackest parts of a photo view. By converting the original photo, whether originally in color or in grayscale, to a high contrast, two color image, the user can readily see where darker areas 24 of the image will require more and/or thicker engraving lines 28 and where thinner or fewer engraving lines 30 will be appropriate in the lighter areas 26. It has been found in accordance with the present invention to generate the underlying photo 25 into the two colors of blue and yellow, with the color blue filling in the darker areas 24 of the photo 25 and the lighter areas 26 being filled with the color yellow. Of course other contrasting colors may be employed. By providing the base image or photo 25 in yellow and blue, the etched lines 28, which comprise visible line portions in the form of black lines 32 surrounded by white space boarders 34, the white boarders 34 creating the "affected area" 36 of each etched line 32, can be easily seen by the user when the etched lines 28 overlay the converted photo 25 in the merged view as shown. Thus, as represented in FIG. 3, the merged view displays a pale yellow-blue luminance version of the photo view with the engraved lines 28 displayed on top of the pale yellow-blue luminance photo 25. The user uses the pointing device 40, as is moveable by use of a computer mouse, pen and tablet, track ball or other similar peripheral devices known in the art connected to a computer running the software of the present invention to continue to add additional engraving lines 28.

By employing black engraving lines, detail for engraving in the blackest part of the image is still possible because details can be observed there. The merged view is generated by first creating the yellow-blue luminance image to the display memory and then by generating the engraved view on top of the same display memory. Each engraved line is displayed as a solid black line painted on a solid white background line of slightly larger width. The average value of the combined lines can be used to represent a corresponding luminance value for each point on the line. Physical limitations of printing engraved images also can restrict the maximum dynamic range of rendered luminance values. Engraved lines are thus prevented from being made too small so as to not have the ability to accept the physical pigments of the ink or so small that the ink will not remain wet. In addition, the engraved areas are prevented from being wholly removed for a large area that would otherwise cause the media to be printed with the engraved image to bottom out into the void when printing. Thus, the dynamic range (white to black) of the luminance levels in an engraved image can be restricted to a range of about 95% (representing white) to about 5% (representing black). With corresponding dynamic ranges for both images, one image will be less likely to dominate over the other image.

Figure 4:
FIG. 4 is a display window on a computer screen showing an engraved view when creating an engraved image in accordance with the principles of the present invention.

As shown in FIG. 4, the engraving marks or lines 28 are continued to be added to the merged image shown in FIG. 3 with various software tools (as will be explained in more detail). By pressing a hotkey, such as the F3 key on a computer keyboard (not shown) or selecting the third icon 46, an engraved view 48 is created. The engraved view 48 only displays the engraved lines 28 that have been generated by the user and/or software. Since the engraving marks or lines 28 are shown in black, when the underlying photo is removed from view, only the engraved lines 28 are visible. By utilizing a white background 44 the white affected areas 36 (shown in FIG. 3) blend into the background 44. When switching between views, the software may be configured to preserve the same pan location and zoom of the photo, merged and engraved views. As such, the user can quickly select between each of the views, such as the original photo view and the engraved view to compare the engraving lines to the original image, for example. This allows the user to easily visualize the quality, position and visual effect of the engraved lines in representing the original photo.

Figure 5:
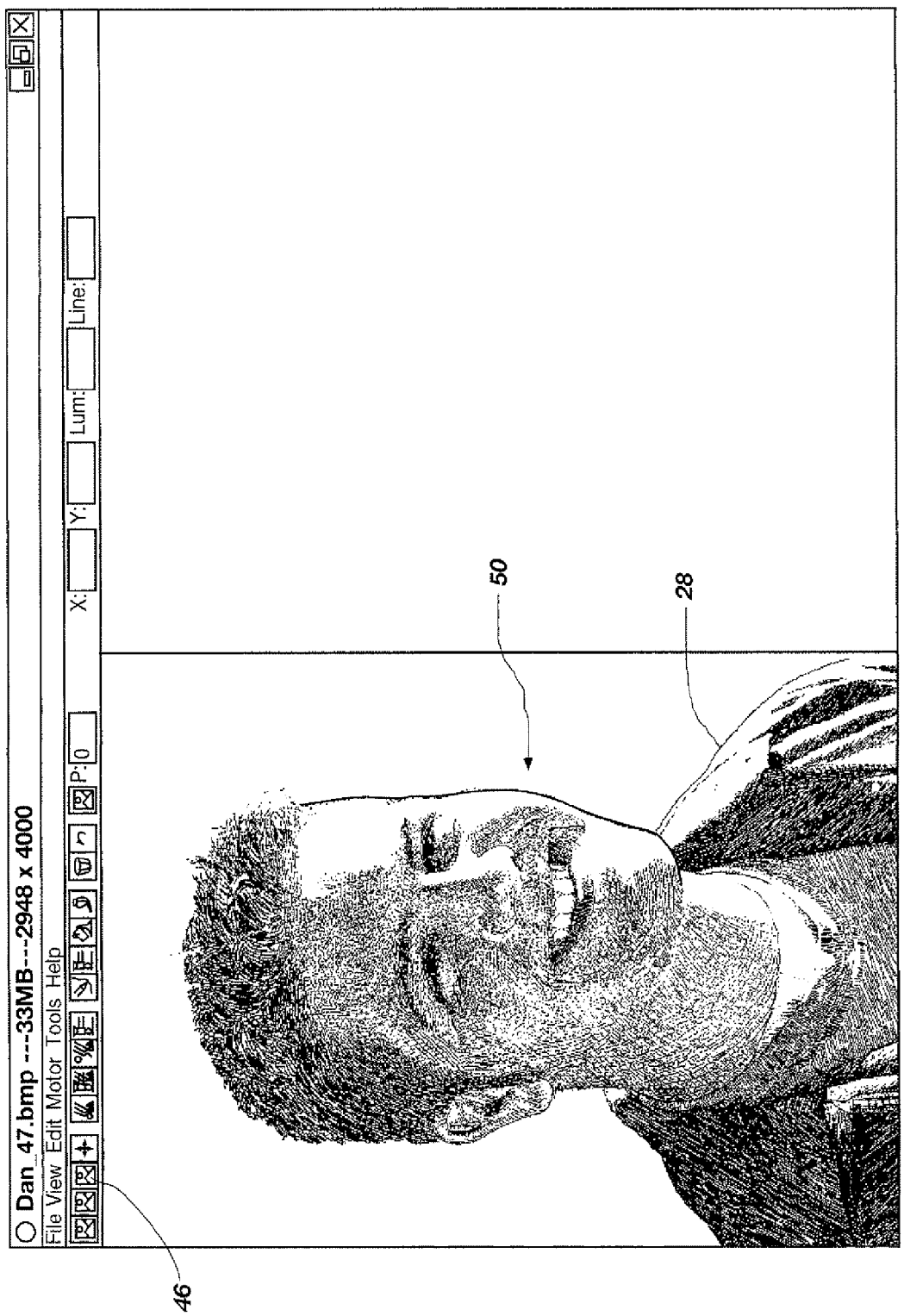
FIG. 5 is a display window on a computer screen showing a completed engraved image created with the engraving software in accordance with the principles of the present invention.

As shown in FIG. 5, once the user has created a number of engraved lines 28, the user can review their progress by viewing the entire engraved image 50. The image 50 has been zoomed out and then the third icon 46 has been selected. The user can continue to add engraving lines 28 until the user is satisfied with the result as shown in FIG. 5. By allowing the user to input individual lines 28 with the input device, such as a computer mouse, tablet and pen or stylus or other input device, the user can insert his or her own artistic talents and style into the finished product such that no two engravings would be exactly the same to create individual works of art. The finished engraving 50 can then be printed or the stored data file can be used by existing engraving machines to engrave the image into a suitable material, such as copper plate, wood, plastic or other suitable materials known in the art. The data file can also be used to print out directly. The data file can also be used directly for display.

Figure 6:
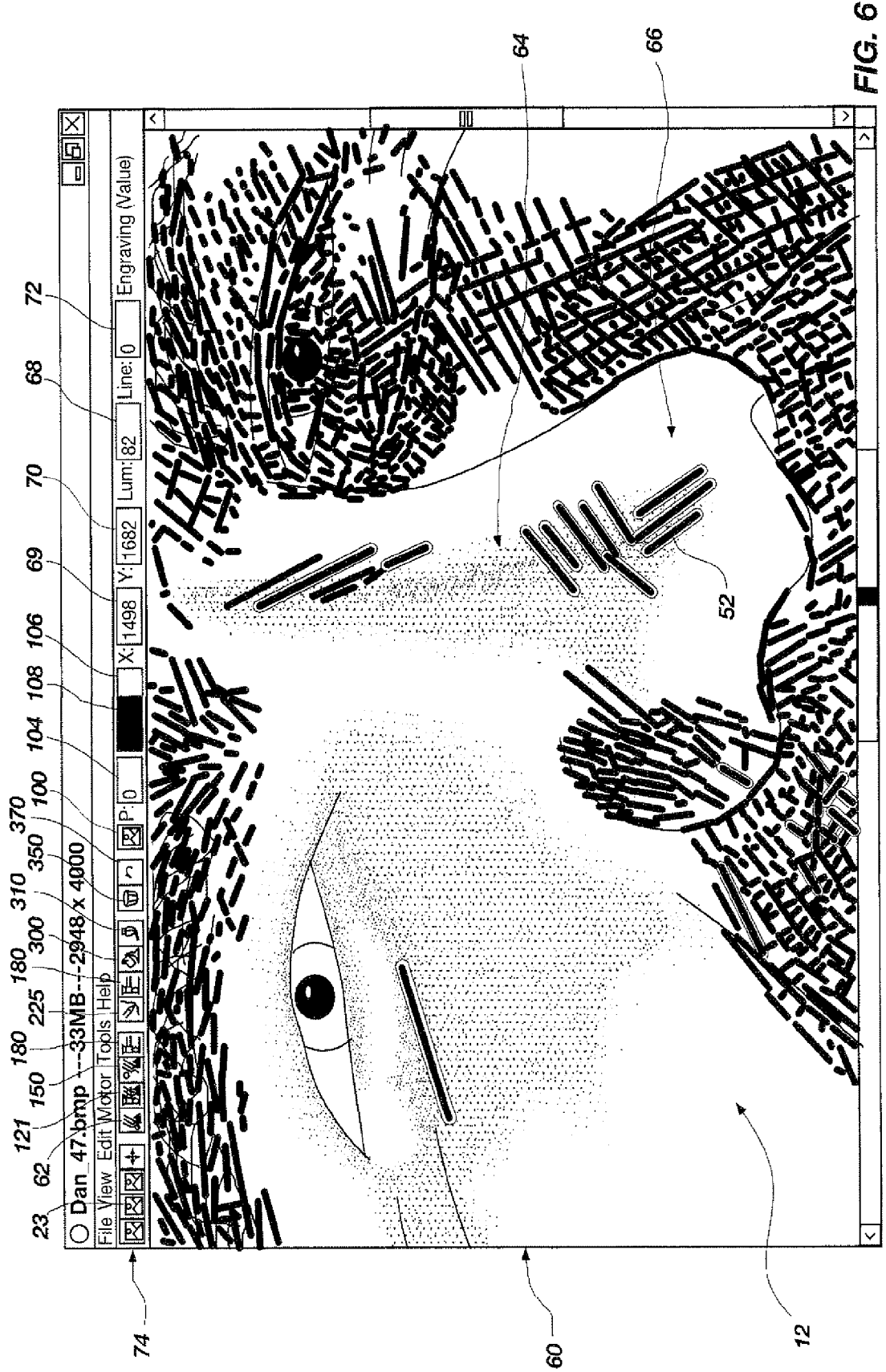
FIG. 6 is a display window on a computer screen showing a merged view when creating an engraved image in accordance with the principles of the present invention.

The software is configured with various engraving tools for creating engraved lines having various values that alter the line thickness, affected area, etc. Referring to FIG. 6, is a merged view 60 generated by selecting the icon 23 in which an engraved line 52 has been created by using an engraving value tool selected by clicking on the engraving value tool icon 62 or pressing a hotkey on a computer keyboard (not shown), such as F5. Using the engraving value tool icon 62 and drawing the line using the computer input device, as by pressing a mouse button and moving the mouse in a direction corresponding to the desired line direction represented in the merged view 60, engraved line 52 is created. Note that the line parameters can be initially controlled by the user. In this example the line preferences have been set to six pixels, such that each line is drawn at an effective line width of six pixels. This allows the user to generate finer engravings by universally setting the line width to a lower pixel counts to generate thinner lines or to generate more coarse appearing engravings by increasing the effective line width.

By using the engraving value icon 62 and resulting engraving tool, engraved lines having computer controlled characteristics can be generated such that the black portions of the lines 52 are thicker in darker areas 64 of the underlying photo or image 12 and thinner in lighter areas 66. Thus, the width of the black portion of the engraved line 52 is a function of the luminance value 68 of the pixels under each point, represented in X and Y positions 69 and 70, of the engraved line 52, the number of which is shown in display value window 72. Accordingly, in this mode, dark areas 64 of the image create wider black portions in the engraving lines 52, while lighter areas 66 of the image 12 generate more narrow black portions in the engraving line 52.

To provide the user with information regarding the underlying value of each line, the tool bar 74 provides the line data in real time. The user will know the particular engraving mode since it is displayed on the tool bar 74, shown as "Engraving (Value)" in this example. The current X position 69 (shown as "X: 1498"), Y position 70 (shown as "Y: 1682"), luminance 68 (shown as "Lum: 82") and line number 72 (shown as "Line: 0"). Each icon provides a graphical indicator of the particular viewing mode or tool being used. For example, the icon 62 may include a representation of a colored image, such as green, under a colored engraving tool, such as yellow, indicating that selecting the icon 62 will result in displaying the merged view which shows both the converted underlying image and the previously created engraved lines.

Figure 7:
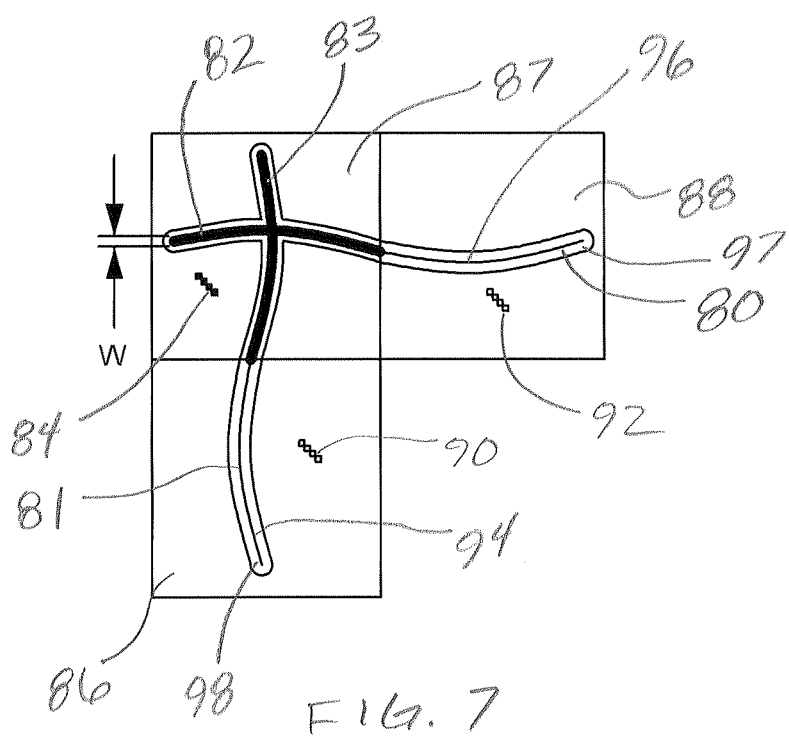
FIGS. 7, 8, 13, 16 are close-up views of engraved lines created with the engraving software in accordance with the principles of the present invention.

As shown in FIG. 7, intersecting engraved lines 80 and 81 are illustrated. The engraved lines 80 and 81 intersect at approximately right angles. To create the lines 80 and 81, the engraving value tool, as previously described, was used. Thus, the width W of the black portion 82 of the engraved line 80 is determined as a function of the luminance value of the pixels 84 and 92 under each point of the engraved line 80. Likewise, the black portion 83 of the engraved line 81 is a function of the luminance value of the pixels 84 and 90 under each point of the engraved line 81. Variations of line width W are evident in the lines 80 and 81 as they cross over pixels in darker area 87, shown with representative darker pixels 84 which could fill the entire area 87 or at least the portion beneath the black portions 82 and 83 of the lines 80 and 81, respectively, as compared to lighter areas 86 and 88, shown with representative lighter pixels 90 and 92, respectively, which would fill at least areas 86 and 88 that are beneath the black portions 82 and 83. Thus, as the lines 80 and 81 pass from darker area 87 to lighter areas 86 and 88, the width of the black portions 82 and 83 of the lines 80 and 81, respectively, the software controls the width changing it from thicker (over the dark area 87) to thinner (over the light areas 86 and 88). Note, however, that in this mode the affected areas 97 and 98 of each line 80 and 81, respectively, has the same width regardless of the width W of the black portion of each line 80 and 81. The engraved value lines 80 and 81 can thus overlap and are merged together such that one line does not dominate over the other line (i.e., one line does not appear to be positioned on top of the other line or otherwise interrupt the continuity of the other line).

Figure 8:
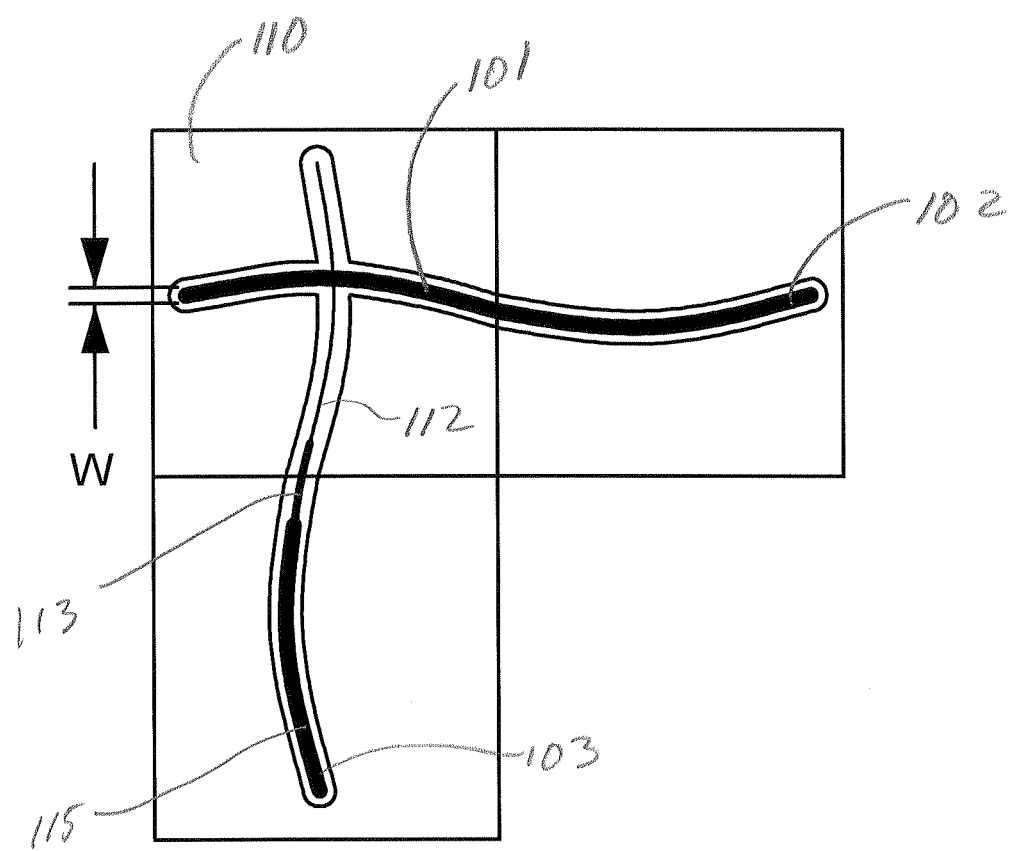

In another mode of engraving, an engraving pressure tool may be selected by selecting the engraving tool icon 62 from the tool bar 74 (as shown in FIG. 6) or by pressing a hotkey, such as F5. In this mode, as shown in FIG. 8, the width W of the black portion 102 of the engraved line 101 is a function of the physical pressure made by a user on a pen tip of a pen and tablet input device (not shown), such as a Wacom pen/tablet, while drawing the line 101. As shown in FIG. 6, the pen tip pressure P value is also dynamically displayed in box 104 as well as in graphical form in the slider box 106, which may include a blue slider bar 108 over a yellow background that increases and decreases simultaneously with the corresponding pen pressure. This way, the user can visualize the relative pen pressure from minimum (0) to maximum (999) on the tool bar in a manner that allows the user to judge the amount of pen pressure that may be appropriate for a particular etched line when compared to the luminance value of the underlying image 12. Thus, referring again to FIG. 8, for a lighter area 110 with higher yellow content, the user can lighten the pressure on the pen to create etched lines with thinner black portions 112 and line thickness transitions 113 between thinner portion 112 and thicker portion 115. Because the user controls the pen pressure and thus the line thickness, the black portion 102 of line 101 can be made wider in lighter portions 110 of the underlying image. Judging the line thickness as a function of pen pressure is visually aided by viewing the comparative amount of yellow to blue in the box 108 shown in FIG. 6. Accordingly, in the pressure engraving mode, heavy pen tip pressure will result in a wider black portion 102 of the engraving line 101 and light pressure will create thinner or more narrow segments in the engraved line 103 with variations of pressure in between creating a transition 113 between thick and think line portions.

Figure 9:
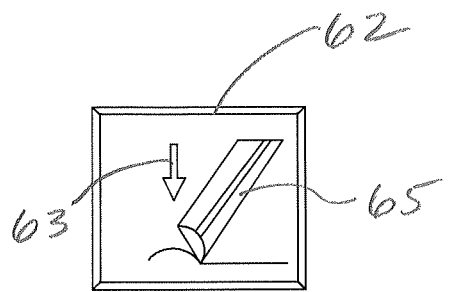
FIGS. 9, 10, 11, 12, 14, 15, 17, 19, 21, 27, 28 and 40 are computer icons of the engraving software in accordance with the principles of the present invention.
Figure 10:
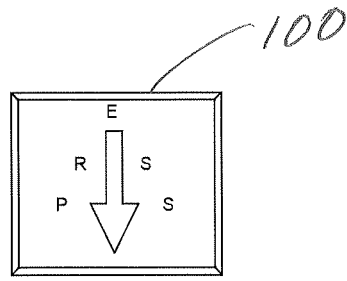

Note that the pressure tool can be scrolled at any time between an underlying value input, a pen tip pressure input and a pen tilt input, in which the angle of the relative to the tablet determines the line width W. The user will know that the pressure engraving tool mode has been selected if the engraving tool icon 62 (FIG. 9) includes a down arrow 63 next to the yellow engraving tool 65. The icon 100 (FIG. 10) has been changed to illustrate pressure and the text adjacent the line data box 72 states "Engraving (Pressure)." The software creates and stores engraving line pressure data derived from image data, pen pressure, tilt and/or pen orientation.

As in other engraving modes, engraved lines 101 and 103 drawn in the engraving pressure mode can form intersecting lines that cross at approximately right angles and in such a manner that the lines 101 and 103 appear to be blended together at their intersection.

Figure 11:
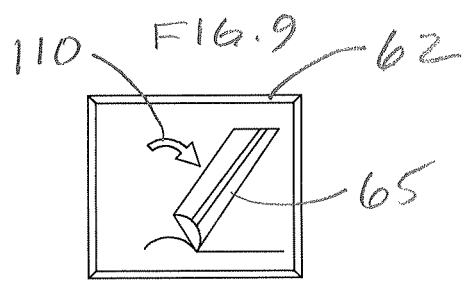
Figure 12:
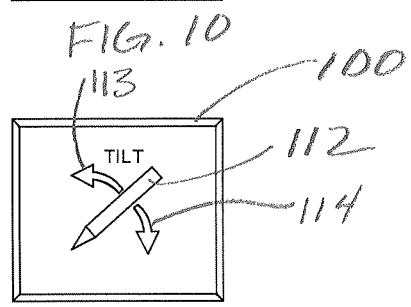

In another engraving mode, an engraving tilt tool is selected by clicking on the engraving tool icon 62 or pressing a hotkey (e.g., "F5"). Repeated clicking of the engraving tool icon 62 will cycle through the various engraving tools that are available. In the engraving tilt mode, the width W of the black portion 102 of the line 101 is controlled by angling or tilting a pen stylus relative to a pen tablet, such as a Wacom pen/tablet. The angle of the pen stylus relative to the pen tablet surface determines the engraving line width. In a vertical or perpendicular pen stylus position, the engrave line width is maximized according to the set software parameters while angling the pen stylus at an angle, such as 45 degrees, relative to the surface of the pen tablet results in thinner engraved lines, again as determined by set software parameters, with variations in pen tilt resulting in corresponding variations in line width. The level of pen tip tilt is dynamically displayed while drawing in the slider box 106 on the tool bar 74 and is also numerically displayed in the "P: ###" field 104 on the tool bar 74. The user will know if the engraving tilt mode has been selected since the icon 62 includes a red angle arrow 110 next to the yellow engraving tool 65 (FIG. 11). In addition the icon 100 is changed to a tilt icon displaying a pen stylus 112 interposed between angle arrow 113 and 114 (FIG. 12). The text adjacent the line data box 72 indicates, "Engraving (Tilt)." It should be noted that in both the pressure engraving mode and tilt engraving mode, the luminance value of the underlying image 12 does not modify the engraving line thickness. This allows for artist impression and individuality in creating engraved images without computer interpolation of line data based upon the luminance of the underlying image. As such, a user can create an engraved image based upon his or her own interpretations and artistic talents alone. For example, an artist using the pressure and/or tilt engraving modes could generate thinner lines over darker portions of the underlying image and generating thicker lines over the lighter portions of the underlying image to create a negative engraved image if desired.

Figure 14:
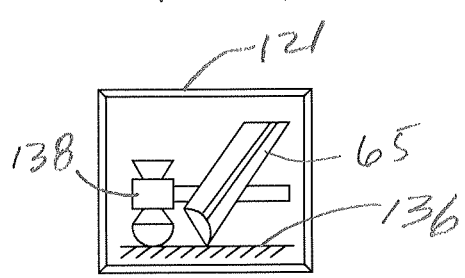
Figure 13:
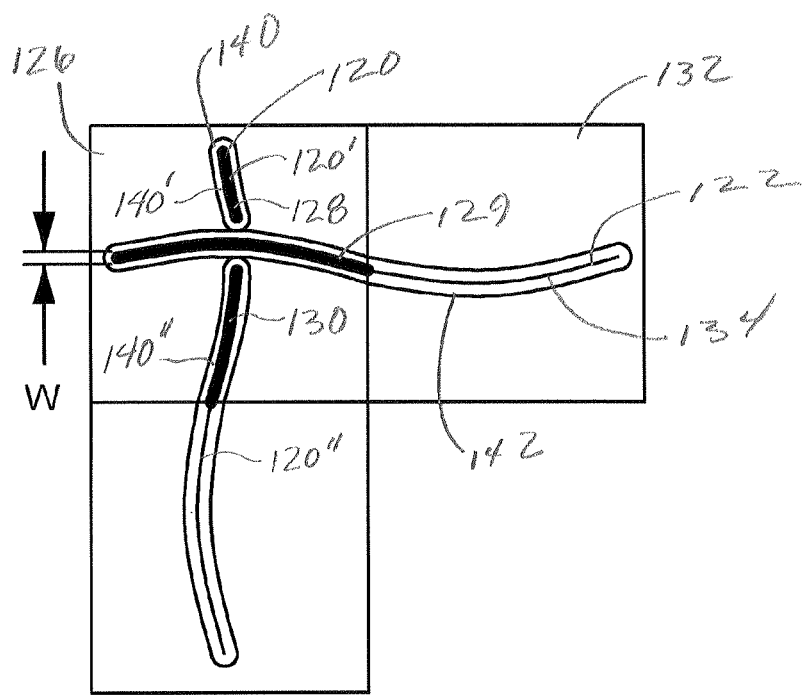

Another type of engraving is shown in FIG. 13. While using the "burnish then engrave" tool, by selecting the burnish then engrave icon 121, shown in FIG. 6, or pressing a "burnish then engrave" hotkey, such as F6, two intersecting lines 120 and 122 have been drawn. With the software controlling the line width W based upon the luminance of the underlying image and more specifically, as a function of the luminance value of the pixels under each point of the engraved lines 120 and 122, darker areas 126 of the image creates wider engraving line portions 128, 129 and 130 while engraving over lighter areas 132 creates more narrow black portions 134 of the engraving line 122. Again, the software provides various visual clues in the tool bar 74 that will let the user know the particular engraving mode and tool being used. For example, the icon 121 (FIG. 14) has a green image 136 under a yellow engraving tool 65 overlying a burnishing tool 138. Also, the icon 100 (FIG. 15) has been changed to a colored photo icon. Moreover, the text adjacent the line data box 72 states, "Burnish then Engrave (Value)."

When the burnish then engrave tool has been selected, engraved lines, such as line 122, that are drawn over previously drawn engraved lines, such as line 120 will cause the previous line 120 to be divided such that the new line 122 intersects the previous line 120 in a manner that allows the new line to be continuous, while causing the previous line to be split at the point of intersection of the two lines. This allows non-overlapping engraved lines to be drawn with new lines essentially cutting through any preexisting engraving lines. When a new line 122 passes over an existing line 120, the affected areas 140' and 140" of the resulting line segments 120' and 120" are recalculated for each line segment 120' and 120" such that the intersecting ends of the resulting line segments 120' and 120" are spaced according the affected areas 140' and 140" from the engraving line 122 and its corresponding affected area 142. Thus, engraved lines 122 created with the burnish then engrave tool do not overlap previously drawn lines. As such, when a line 122 created with the burnish then engrave tool crosses over an existing engraved line 120 (no matter what tool was used to create the existing line), the portion of the existing engraved line 120 (and its corresponding affected area 140) which would be under the new burnish then engrave line is automatically erased. Accordingly, the burnish then engrave value tool erases any portion of any previous engraved line it covers and converts the remaining line segments 120' and 120" into independent line segments. Essentially, the burnish then engrave tool first burnishes (erases) any previous lines along its drawing path and then engraves the new engraved line along the drawing path of the line 122.

As with any of the engraving tools described herein, burnish then engrave lines can be created using a "value" parameter such that the luminance of the underlying image controls the line width or by using "pressure" or "tilt" input parameters as previously discussed. By repeated selecting the burnish then engrave icon 121, the user can select between value, pressure and tilt inputs. The toolbar 74 will display the mode that has been selected by the user.

Figure 17:
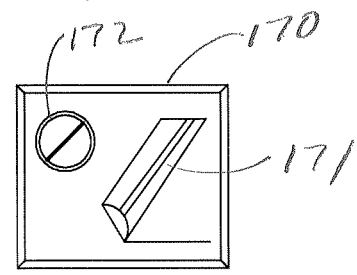
Figure 15:
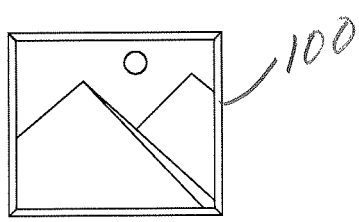
Figure 16:
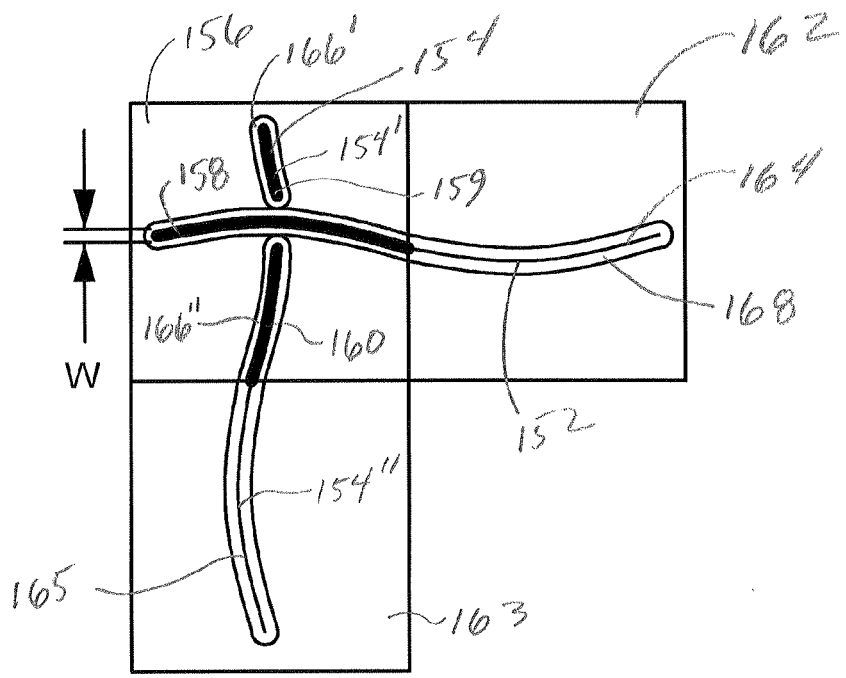

Yet another mode of engraving is shown in FIG. 16. While using the "engrave un-engrave" tool, by selecting the engrave un-engrave icon 150, shown in FIG. 6, or pressing a "engrave un-engrave" hotkey, such as F7, two intersecting lines 152 and 154 have been drawn. With the software controlling the line width W based upon the luminance of the underlying image and more specifically, as a function of the luminance value of the pixels under each point of the engraved lines 152 and 154, darker area 156 of the image creates wider engraving line portions 158, 159 and 160 while engraving over lighter areas 162 and 163 creates more narrow black portions 164 and 165 of the engraving lines 152 and 154, respectively. Again, the software provides various visual clues in the tool bar 74 that will let the user know the particular engraving mode and tool being used. For example, the icon 170 (FIG. 17) depicts an engraving tool 171 along side a crossed-out circle 172 that may be in red. In the luminance "value" mode, the icon 100 will be in the form of the colored photo icon (FIG. 15). Moreover, the text adjacent the line data box 72 states, "Engrave un-engrave (Value)."

When the engrave un-engrave tool has been selected, engraved lines, such as line 154, that are drawn over previously drawn engraved lines, such as line 152 will not intersect the previously drawn line 152. Thus, the new engrave un-engrave (value) line is forced to jump over that portion of the previously drawn line 152 that the second line 154 crosses. The engrave un-engrave tool allows new lines to be drawn without affecting any preexisting lines in order to fill in new engraved lines within existing spaces formed by previously drawn engraving lines. This allows previously drawn line 152 to maintain its length, while causing the new line 154 to be split at the point of intersection of the two lines. This allows non-overlapping engraved lines to be drawn with new lines essentially being cut by any preexisting engraving lines. When a new line 154 passes over an existing line 152, the affected areas 166' and 166" of the resulting line segments 154' and 154" are recalculated for each line segment 154' and 154" such that the intersecting ends of the resulting line segments 154' and 154" are spaced according the affected areas 166' and 166" from the engraving line 152 and its corresponding affected area 168. Thus, engraved lines 154 created with the engrave un-engrave tool do not overlap previously drawn lines. As such, when the engrave un-engrave line 154 crosses over an existing engraved line 152 (no matter what tool was used to create the previous line), the portion of the existing engraved line 152 (and its corresponding affected area 168) which would otherwise be under the new engrave un-engrave line is maintained. Thus, the engrave un-engrave value tool erases any portion of any new engraved lines that would otherwise cover any existing engraved lines and converts the new line into multiple line segments 154' and 154". Essentially, the engrave un-engrave tool works oppositely to the burnish then engrave tool by erasing any newly created line portions that extend over previously drawn engraving lines.

As with any of the engraving tools described herein, engrave un-engrave lines can be created using a "value" parameter such that the luminance of the underlying image controls the line width or by using "pressure" or "tilt" input parameters as previously discussed. By repeated selecting the engrave un-engrave icon 170, the user can select between value, pressure and tilt inputs. The toolbar 74 will display the particular mode that has been selected by the user.

Figure 19:
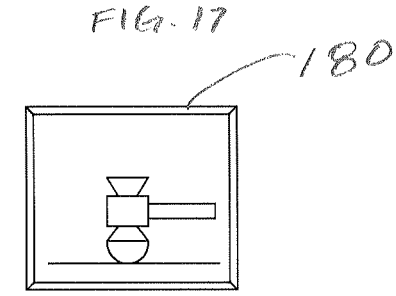
Figure 18:
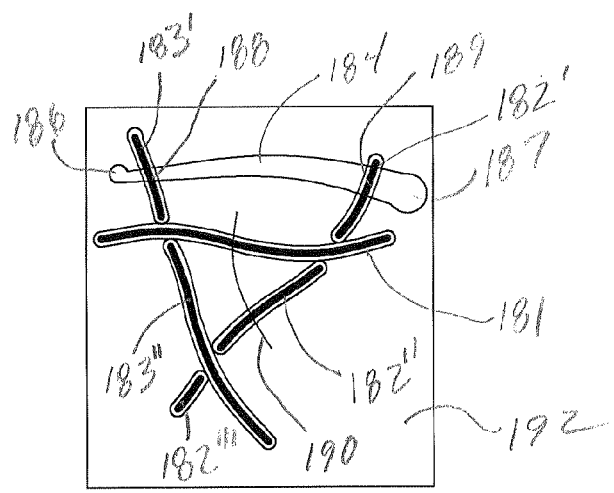
FIGS. 18, 20 and 22 are close-up views of engraved lines to illustrate various deletion functions of the engraving software in accordance with the principles of the present invention.

As engraving lines are created, there may be certain instances when certain lines or portions thereof are not desired. The software provides tools for removing previously drawn lines or portions thereof. Accordingly, two erasing tools are provided. The first, referred to as "burnish line," allows the user to erase a portion of a previously drawn line. As shown in FIG. 18, six engraving lines 181, 182', 182", 182''', 183' and 183" are shown. By selecting the burnish tool, either by pressing a hot key, such as "F8," or by selecting the burnish tool icon 180 (see FIG. 19) the user can selectively erase portions of one or more of the lines 183' and 182'. Once the burnishing tool is selected, the text in the tool bar 74 will display "Burnish Line" and the pointing device will become a pressure sensitive brush. Using a pen tablet, the diameter of the brush is a function of pen stylus tip pressure, such that higher pressure results in a larger diameter brush. In order to erase portions of lines 183' and 182', a mark 184 is drawn across the line portions to be erased. The mark 184 begins at a first point 186 where pressure was first applied and continues along a path to a second point 187 where pressure is released. In this example, the pressure at point 186 was less than the pressure at point 187 resulting in a widening mark 184 between point 186 and point 187. The mark may be in form of a semi-translucent mark, such as a pale blue mark, such that the underlying image as well as the lines 183' and 182' and 187 over which the mark 184 is applied are visible.

Figure 20:
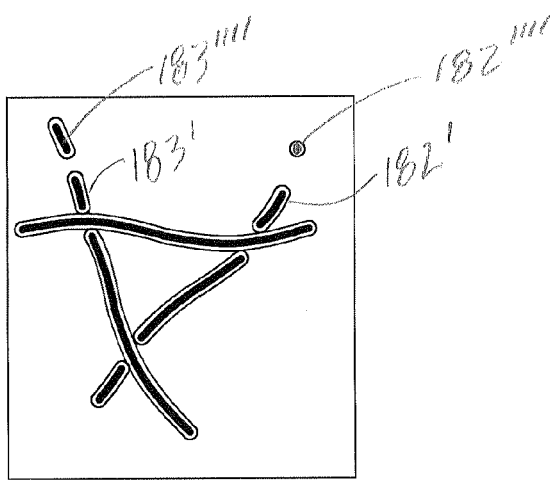

As shown in FIG. 20, when the user releases pressure form the tip of the pen stylus, of the pointing device, the software will automatically and immediately erase the portions 188 and 189 from lines 182' and 183' that were covered by the blue mark 184 shown in FIG. 18. The software converts the remaining engraving line fragments into individual engraving lines 183', 183'''', 182' and 182''''. As such, swaths of portions of engraving lines can be erased by clicking and dragging the burnishing brush over portions of engraving lines sought to be erased.

Figure 21:
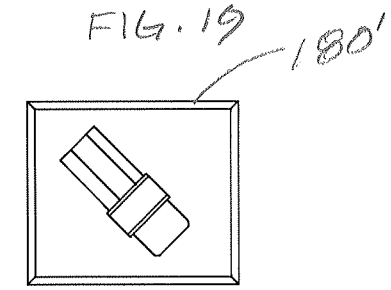
Figure 22:
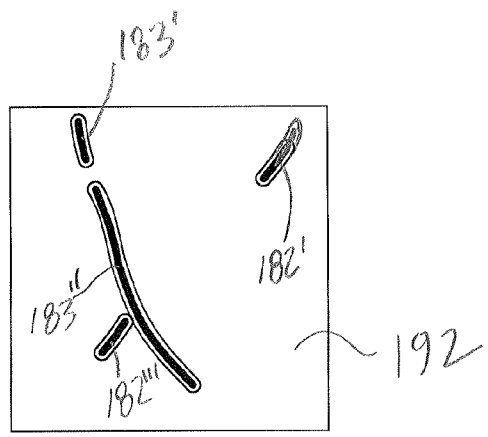

Referring again to FIG. 18, another mode of engraving line removal is illustrated. By clicking on the "Draw over Line to Erase" icon 180' shown in FIG. 21 or by pressing a hotkey, such as "F8," until the icon 180 displays a pencil eraser and the text in the toolbar 74 states "Draw over Line to Erase," the pointing device will allow a line 190 to be drawn. Note that this tool can be scrolled at any time between the burnish line tool and erase line tool and back by clicking on the icon 180 or by repeatedly pressing the appropriate hotkey. The erase line 190 has been drawn over the top of two of the lines 181 and 182" in the image 192. This new line is visually distinguishable from the existing engraving lines 181, 182', 182", 183', 183" and 183''' because it has no white affected area surrounding it. The line 190 will be visible to the user until the user releases pressure from the pen tip of the pointing device. As shown in FIG. 22, when the pen tip pressure is released, the engraving lines 181 and 182" that were marked by the erase line 190 are completely erased. All other engraving lines 182', 182", 183' and 183" are unaffected and remain undisturbed in the image 192.

When drawing engraving lines as previously described it may be desirable to link new lines to previously drawn lines. The software according to the present invention allows lines to be connected to the nearest endpoint of existing lines. By pressing the "Ctrl" key, for example, at the beginning of drawing any engraving line causes the beginning of the new line to search for the nearest endpoint of a previously drawn engraved line and connects the new line to the existing line endpoint as though the combination of lines were to become a single continuous line. Pressing the "Ctrl" key at the end of drawing an engraved line will cause a search for the nearest endpoint of a previously drawn engraved line and connect the new line to the existing line as though the lines were a single continuous line. The search is arbitrarily limited to the value entered in the "Preferences" dialog for "Pixels between Traced Lines," as will be discussed in more detail herein. If the software search does not find an endpoint within the pre-specified radius, the new engraving line will begin or end at the current pointing device location. The "Ctrl" key begin and end feature works for all engraving tools including the burnish then engrave tool and the engrave un-engrave tool previously discussed.

Figure 23:
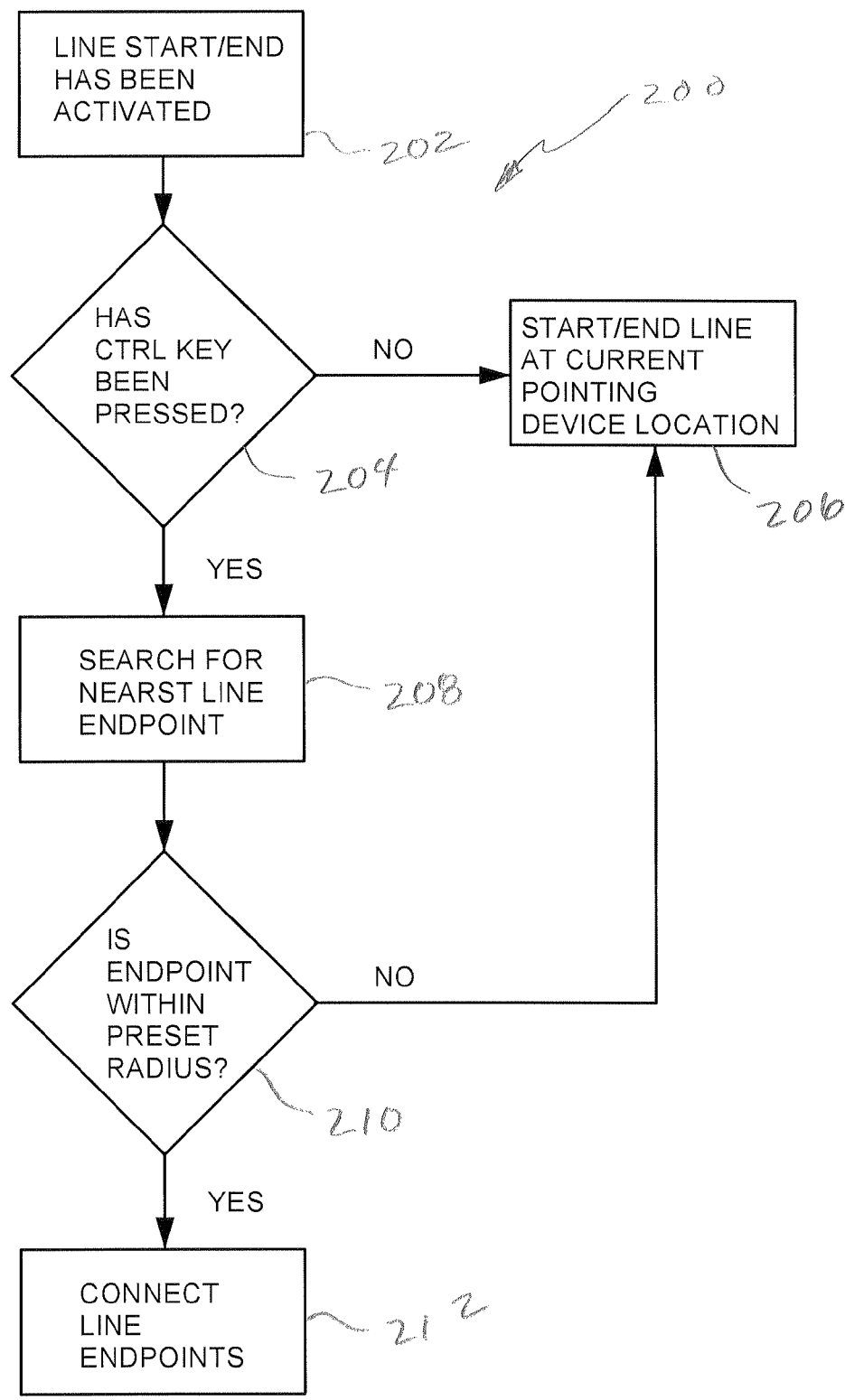
FIG. 23 is a flow diagram of a method for identifying engraved line endpoints according to the principles of the present invention.

This process 200 is illustrated in FIG. 23. When the start or end of an engraved line has been activated 202, the software will determine 204 whether the "CTRL" key has been pressed. If not, the software will cause 206 the line to start or end, as the case may be, at the current pointing device position. If so, the software will search 208 for the nearest preexisting engraving line endpoint in the image. If the software determines 210 that an endpoint of a preexisting line is within the preset radius, the lines will be automatically connected 212 at their respective endpoints.

If the "Ctrl" key is pressed during the drawing of a line, the line will rubber band from the point at which the "Ctrl" key was first pressed and then snap to that point where the "Ctrl" key is released. If the "Alt" key is pressed during the drawing of a line, the pen or other input device, can be lifted and tapped to create a series of points. When the "Alt" key is released, the engraving line will resume in the normal drawing mode as the next point the pen begins to drawn. The series of points created are then used to create a poly Bézier curve and connect the piece-wise drawing segments as though they were a continuation of the poly Bézier curves. It is noted that while reference has been made to specific keys for performing the foregoing functions, it is contemplated that other keys could be programmed to perform these functions without departing from the spirit of the present invention.

Figure 24A:
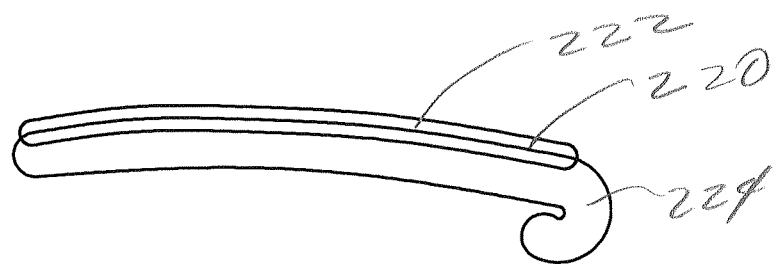
FIGS. 24A, 24B, 24C and 24D are views of engraved lines to illustrate a trace line function of the engraving software in accordance with the principles of the present invention.

Another form of engraved images uses trace lines in which the engraved lines appear to be in parallel over portions of the image. This is at least in part the type of engraving used on United States paper currency and is different from the engraved image created with random engraved lines as shown in FIG. 5. As shown in FIG. 24A, a first engraving line 220 has been drawn wherein the line is shown in black and the affected area 222 of the engraved line is shown in white. As previously discussed, areas of the image in the merged view that have no engraving marks appear as a pale yellow-blue image. Note that the trash can icon shown in FIG. 6 has no cyan color in it. This indicates that no areas of the merged image have been made into marked areas. By selecting the trace line tool, which can be chosen by the user by clicking on the icon 225 or pressing the appropriate hotkey, such as the "F9" key, the pointing device becomes a pressure sensitive brush wherein the brush diameter is a function of pen stylus pressure. If there are no marked areas in the image, the software will automatically create marked areas to surround all existing engraving lines. The marked areas 227 extend outward from the center of the engraved lines by the value given in "Pixels Between Traced Lines" in the preferences menu. These new marked areas 227 (which have been automatically created) are shown as a cyan colored area surrounding each engraving line.

Figure 24B:
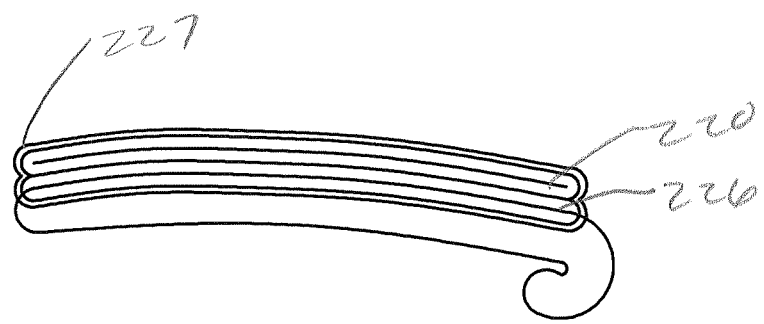
Figure 24C:
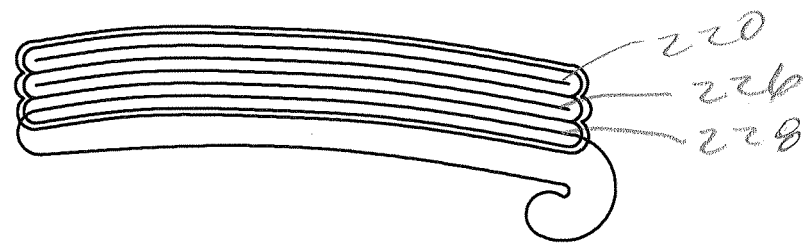
Figure 24D:
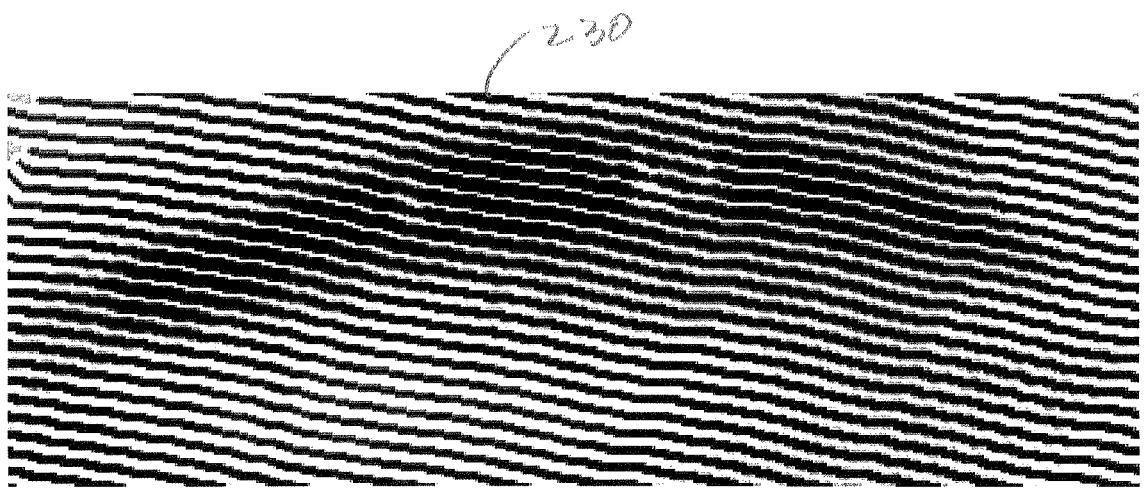

Once the trace line tool has been selected, the user can create a mark 224 as shown. The trace mark 224 will appear as a translucent blue having a width determined by the pressure applied to the pen stylus. By tracing the line 220 along one side thereof, the software is instructed to create a trace line 226, as shown in FIG. 24B adjacent and somewhat parallel to the first line 220 along the side of the line 220 where the mark 224 was created. That is, the second line 226 traces the first line 220. The trace mark 224 will remain visible so long as the user maintains pressure on the pen stylus. As soon as the pressure is released, the software will determine that the trace mark 224 has been ended and will automatically generate the new trace line 226. By repeating this process above and below the first line 220, as shown in FIGS. 24B and 24C, using the trace line tool, additional trace lines 228 are automatically created. Each trace line 230, as shown in FIG. 24D, may vary in width along its length depending on the luminance of the underlying image. Accordingly, the trace lines, when combined, create an engraved image that is based upon the luminance of the underlying image, in this example, the eye of a subject. Once the user selects a tool other than the trace line tool, the cyan color surrounding the engraved lines indicating the marked areas are automatically removed. The resulting "somewhat parallel lines" represent a typical classical engraving technique used by some engraving artists and differs from the "somewhat random lines" used in the image shown in FIG. 5.

Figure 25A:
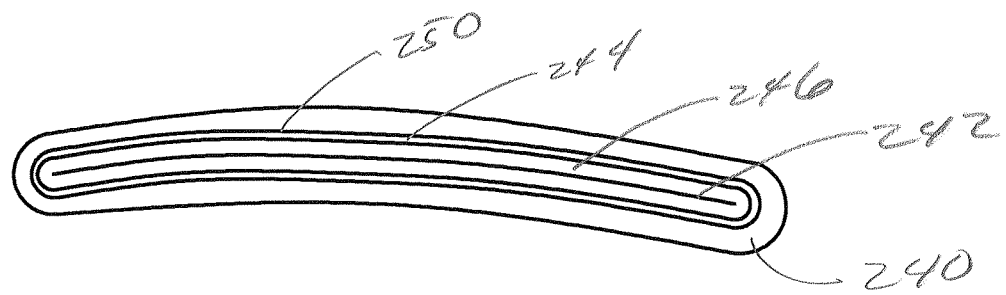
FIGS. 25A and 25B are views of engraved lines to illustrate another trace line function of the engraving software in accordance with the principles of the present invention.
Figure 25B:
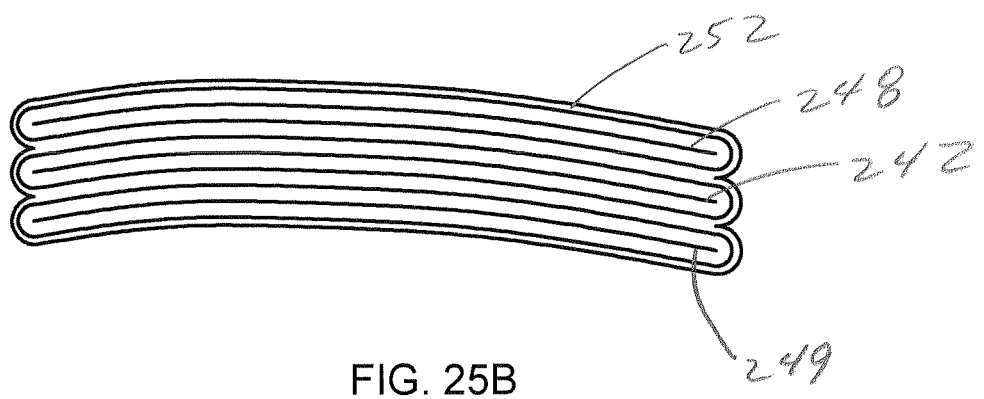

A trace line brush mark 240 can also be used to create more than one trace line. As shown in FIG. 25A, the trace line brush mark 240, drawn over an existing engraved line 242, straddles both sides of the engraved line 242. The marked area 244, which is different from the affected area 246, is created when the trace line tool is first selected. The trace line brush mark 240 remains visible until the user releases pressure from the pen tip of the pointing device (not shown). A shown in FIG. 25B, when the pen tip pressure is released, the software automatically creates trace line 248 above original engraved line 242 and trace line 249 below original engraved line 242. These engraved lines 248 and 249 trace the first line. The second and third lines 248 and 249 are formed along the edge 250 of the marked area 244. Once the new lines 248 and 249 are created, a new marked area 252 is also automatically created around the new engraved lines 248 and 249.

The marked area 252 can be modified in the preferences menu by changing the value in the "Pixels Between Traced Lines." For example, the "Pixels Between Traced Lines" could be set at six pixels, twelve pixels or any other number as desired. By increasing the pixels between traced lines, the separation between subsequently created, adjacent traced lines becomes larger resulting in engraved images that appear more coarse. Conversely, images created using the trace line tool where the pixel between lines has been lowered results in engraved images that appear more fine. For example to create a more coarse looking engraved image, the pixels per line could be set to 20 pixels per line, the pixels between traced lines set to 20 pixels, the maximum white width set to 20 pixels per line and the max/min line width ratio set to 10.0 in the preferences menu. For finer images, the pixels per line could be set to 6 pixels per line, the maximum white width set to 6 pixels per line and the max/min line width ratio set equal 10.0.

Figure 26A:
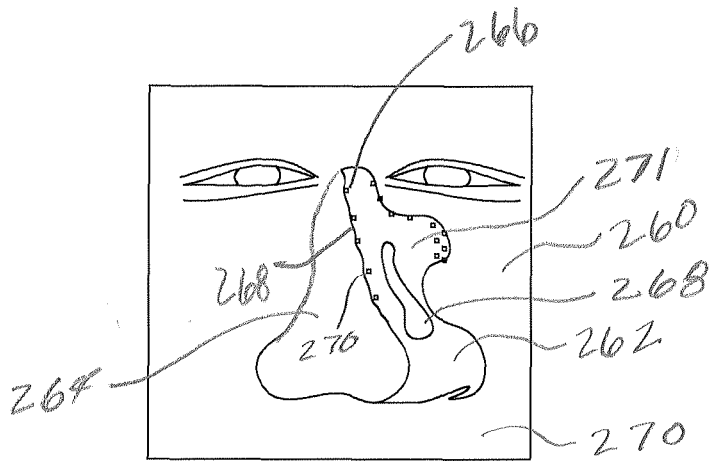
FIGS. 26A, 26B and 26C are views of an underlying image being marked with an area marking tool in accordance with the principles of the present invention.

An important feature of the software of the present invention, referred herein as "marked areas," enables the user to create more precise engraving lines within certain specified areas. By separating certain areas of the underlying image, the user can generate engraved lines along a defined edge of the underlying image, such as a visual edge created between light and dark areas of the underlying image, or within a specific area of the underlying image, such as within a predominately lighter area. As shown in FIG. 26A, a portion of the underlying image 260 (the side of a subject's nose shown in the image 260) is highlighted. Such highlights resulting from brighter portions in the image 260, which may be the result of ambient light reflections, are represented as pale yellow portions 262 in the merged view, while the darker areas 264 in the merged view are represented in shades of blue. When the image 260 comprises a photographic image, these light and dark areas 262 and 264 do not always have smooth or clean delineations between the light and dark areas 262 and 264, especially when the subject image is not completely smooth, as is with the case of the face of a person. Thus, there may be darker pixels 266 that lie within the lighter area 262 near the transition between light and dark areas 262 and 264. In addition, the transition line 268 may not be smooth or continuous.

Figure 27:
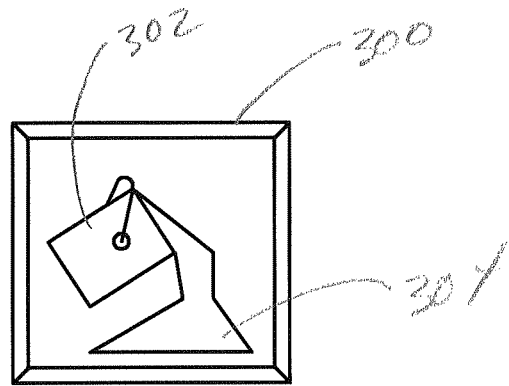

The mark area tool can be selected by clicking on the icon 300 (see FIG. 6 and FIG. 27) or by pressing a keyboard hotkey, such as F11. The mark area tool icon 300 is a graphical representation of a paint can 302 in a tipped position with paint 304 being poured from the paint can 302. Once this mark area tool is selected, a pressure sensitive brush, with the brush diameter equal to a function of pen stylus pressure, can be used to draw the brush mark 268. Once selected, the text in the tool bar 74 will display "Mark Area." The brush mark 268 appears as a light blue or white mark over the pale yellow/blue merged image so as to be easily visible. For illustrative purposes, the mark 268 has been drawn in the lighter area 262 of the underlying image 260. Once drawn, the software connects all pixels having luminance values in the range of values under the marked area. The software selects all pixels around the brush mark 268 having luminance values in the range of values that are contained within the brush mark 268. Once the connected area of pixels 262 having these values is determined, the remaining pixels 270 which are not connected are marked (i.e., highlighted) and displayed by showing them in a green hue. Also, the brush mark 268 is automatically erased. The green marked (highlighted) area 270, which in this example, coincides with the darker areas 264 of the underlying image, can be thought of as pixels 270 which will not be processed in subsequent operations. The unmarked or normal area 271 which contains pixels having appropriate luminance values will be displayed in pale yellow so as to be easily visually distinguishable form the marked green area 270. As such, the image 260 will change from the pale yellow/blue merged image into a pale yellow/green image where the yellow portion 271 will constitute the only portion of the image 260 where further operations can be performed until the user changes to a different mode.

Figure 26B:
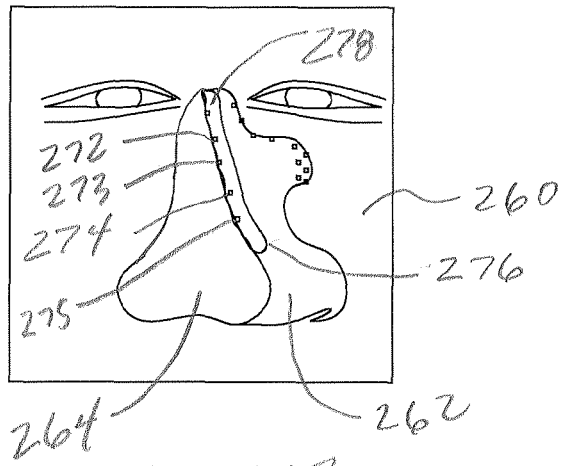
Figure 28:
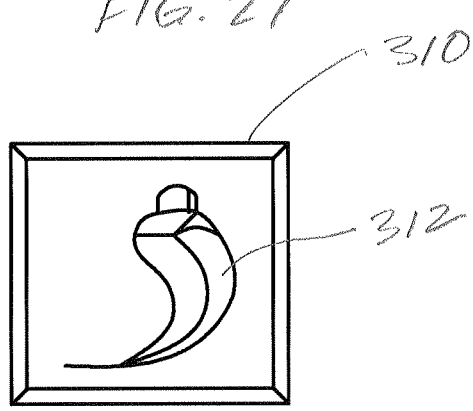

Once the unmarked area 271 is created, various functions can be performed. As shown in FIG. 26B, the user can now select the paint highlighted area tool icon 310 (see FIG. 6 and FIG. 28), which is in the form of a paintbrush 312. This tool can be selected by clicking on the icon 310 or by pressing the appropriate hotkey, such as the "F12" key on a computer keyboard. When selected, the pointing device becomes a pressure sensitive brush, whereby the brush diameter is a function of pen stylus pressure. As shown in FIG. 26B, the pixels 272 and 274 of the underlying image 260 that are contained within the boundary 276 of the brush mark 278 are shown in various shades of blue depending on the luminance of the underlying image 260, while areas in pale yellow are displayed in white. By using the brush, the user can paint specific light blue pixels, such as pixels 272 and 274 that may be in an area where the user desires higher contrast between the light area 262 and the darker area 264. The rest of the image 260, outside the brush marked area are displayed in shades of green with the lightest portion 262 of the image 260.

Figure 26C:
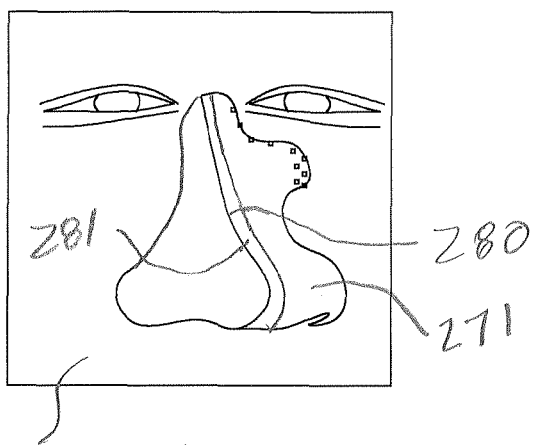

As shown in FIG. 26C, when the pressure on the pen stylus is released, all of the light blue pixels, such as pixels 272 and 274 in the brush marked area 278 shown in FIG. 26B are deleted from the marked (highlighted) area 278. Any pixels 273 and 275 which were previously marked green (highlighted) under the brush mark 278 have now turned back to the normal pale yellow-blue of the normal merged image. In this example, the purpose of the paint highlighted area tool used in the unmarked area 271 is to create a smooth edge 280 in the marked area boundary 281 on the ridge of the nose. Note that the paint highlighted area tool decreases the marked (highlighted) area 270.

Another function that can be performed when a marked area 270 has been created is the burnish highlighted area tool, which is automatically selected when the burnish tool icon 180 (see FIGS. 6 and 19) is selected in the marked area mode or by pressing a hotkey such as "F10." When the burnish tool is selected, the pointing device becomes a pressure sensitive brush where brush diameter is a function of pen stylus pressure. In the burnish highlighted area mode, the user can paint the bright yellow pixels, such as pixels 282 and 284 with this brush. The brush mark 286 will appear as a bright yellow streak over the pale yellow and green pixels of the underlying image.

Figure 29A:
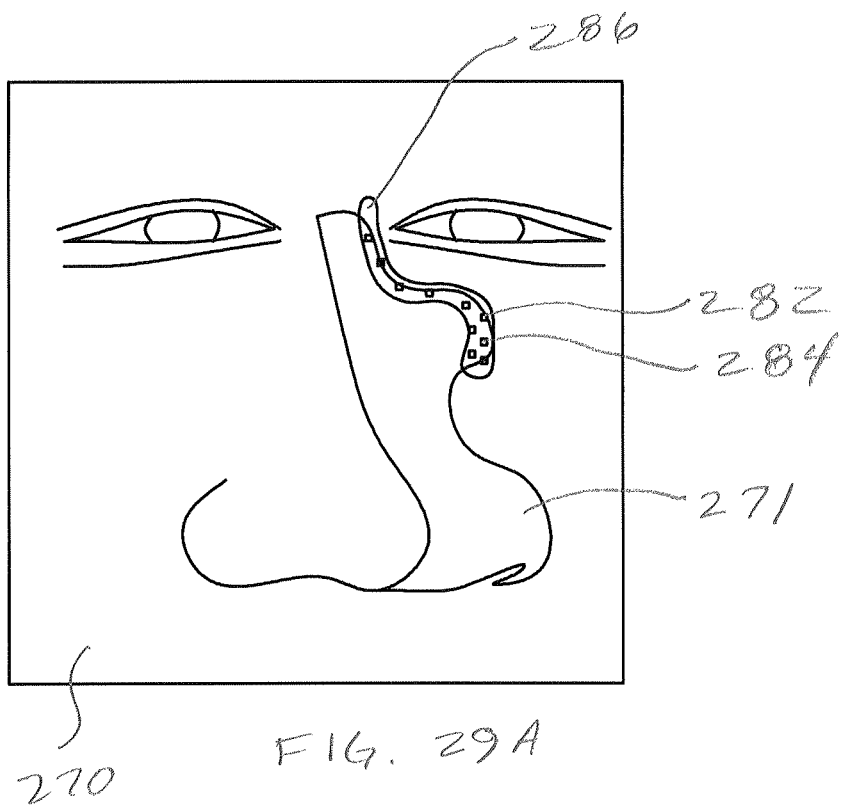
FIGS. 29A and 29B are views of an underlying image in which the marked area is being modified with the software in accordance with the principles of the present invention.
Figure 29B:
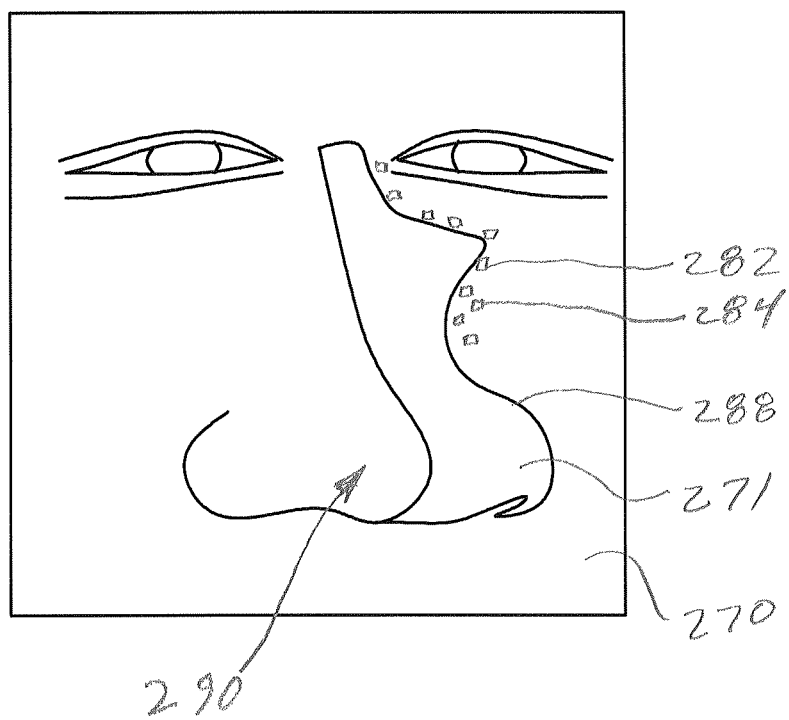

As shown in FIG. 29B, as soon as pressure from the pen tip is released, all of the bright yellow pixels in the brush marked area 286 of FIG. 29A have been excluded from the unmarked area 271 and thus processed as indicated by the fact that they are now highlighted by being painted green. In this example, the purpose of the burnish highlighted area tool in the unmarked area 271 is to create a smooth boundary edge 288 between the unmarked area 271 and marked area 270 in the shadowed area to the right of the nose 290. The burnish highlighted area tool increases the marked (highlighted) area.

Figure 30A:
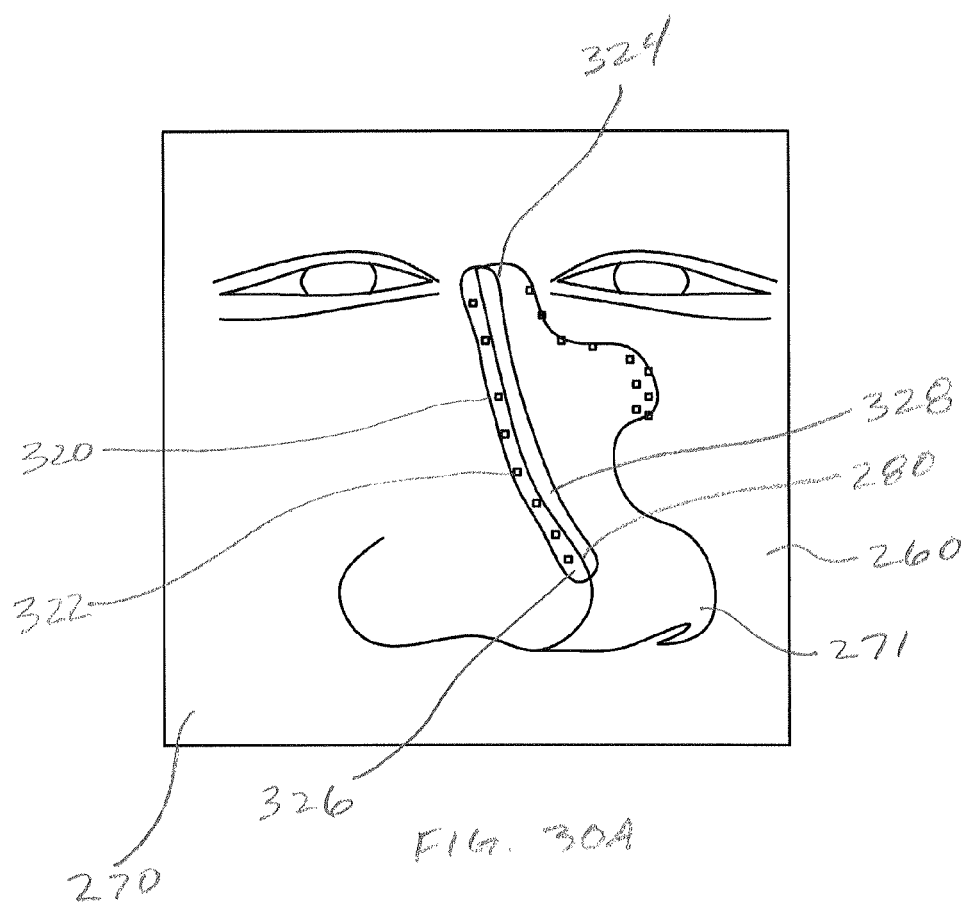
FIGS. 30A and 30B are views of an underlying image in which an edge of a marked area is being traced with an engraving line in accordance with the principles of the present invention.
Figure 30B:
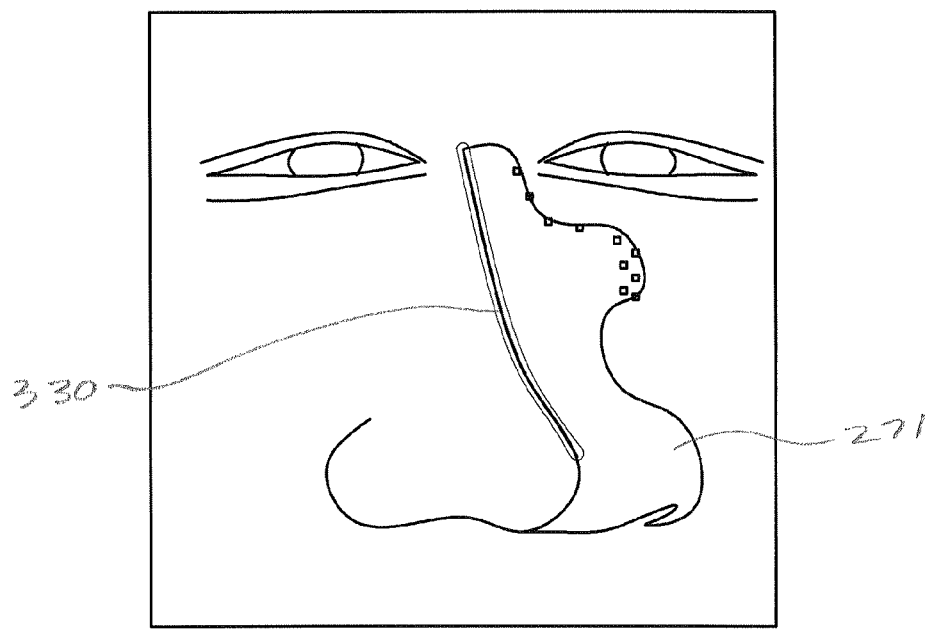

Referring again briefly to FIG. 26C, if a user desires to create a trace line along the edge 280 of the marked boundary 281, the user can select the trace line tool by clicking on the trace line tool icon 225 (see FIG. 6) or hot key F9. When selected, the bright green pixels of the marked area 270 became paler green. As previously described with use of the trace line tool, the pointing device becomes a pressure sensitive brush with brush diameter equal to a function of pen pressure. As shown in FIG. 30A, the user can then paint the blue pixels shown in along the edge 280 by creating a brush mark 324. The brush mark will appear to have a blue portion 326 over the dark pixels of the underlying image 260 and a white portion 328 over the yellow highlighted area 271.

As soon as the pressure on the pen stylus is released, any pixels 320 and 322 that were painted blue within the unmarked area 271 and that were contained within the brush mark area 324 (i.e., on the boundary between the unmarked area 271 area (displayed in yellow) and the marked or excluded area 270 (marked or highlighted in light green) become part of a newly engraved trace line 330. As such, by creating the marked area 270 and creating an edge 280 between the marked and unmarked areas, an outline of an object or feature can be quickly generated.

Figure 31A:
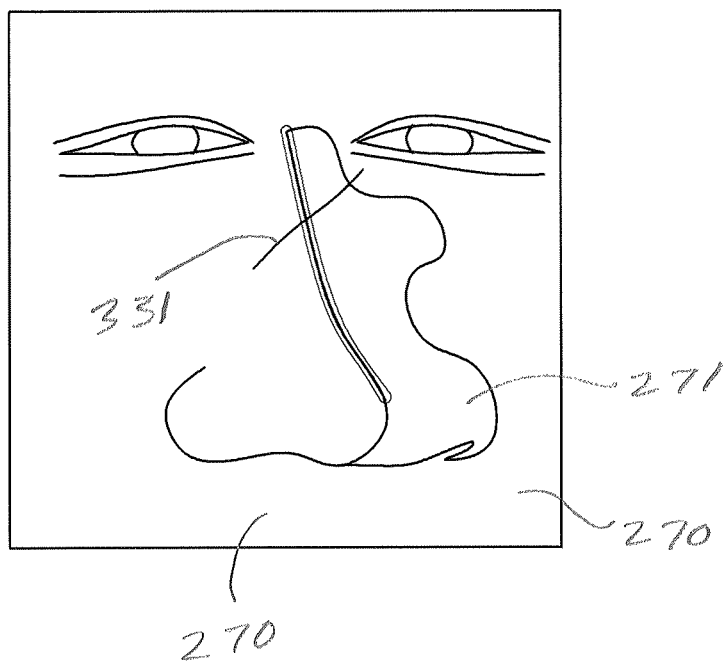
FIGS. 31A and 31B are views of an underlying image in which an engraving line is being excluded from the marked area in accordance with the principles of the present invention.
Figure 31B:
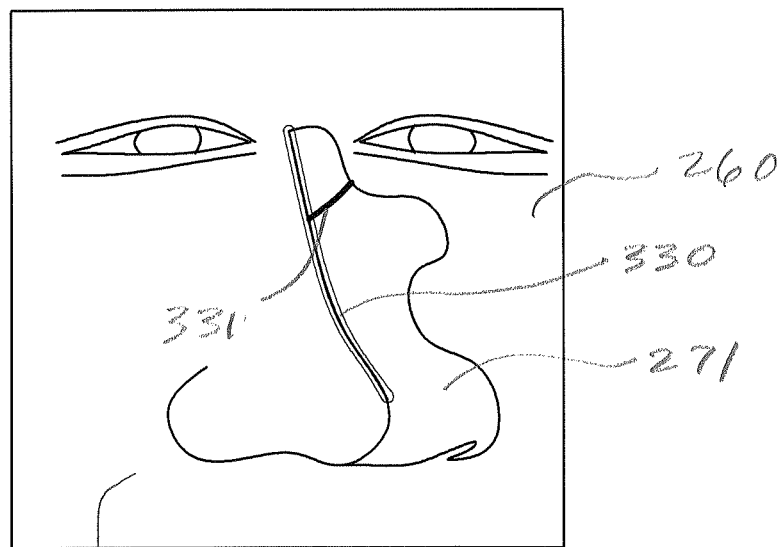

As shown in FIGS. 31A and 31B, a user can select the engraving pressure tool previously discussed in the marked area mode. Doing so, allows the user to create engraving lines that will only be generated within the normal or unmarked area 271. Using the engraving line tool, the user can draw a line 331 diagonally from the right eye to the left side of the nose as illustrated. In the marked area mode, the line 331 is blue in color depicting heavy pressure whereas light pressure is otherwise indicated by a black line. Note that the line 331 crosses both marked (highlighted) areas 270 and normal unmarked areas 271.

As further illustrated in FIG. 31B, as soon as the user releases pressure from the pen tip of the pointing device, the software immediately discards all portions of the line 331 that are outside the normal area 271. The software also converts that portion of the line 331 within the normal area 271 to a simulated engraved line using the pressure data recorded by the software. Because of the heavy pressure used, the resulting engraved line 331 is darker than the other engraved line 330 that was lighter because the line 330 was created based on the underlying image luminescence. Accordingly, by using image area marking as herein described, the user can create specific areas 271 within the image 260 within which engraving will only be allowed. Thus, any lines or portions of lines drawn in the marked (highlighted green) area 270 are excluded and eliminated.

Figure 40:
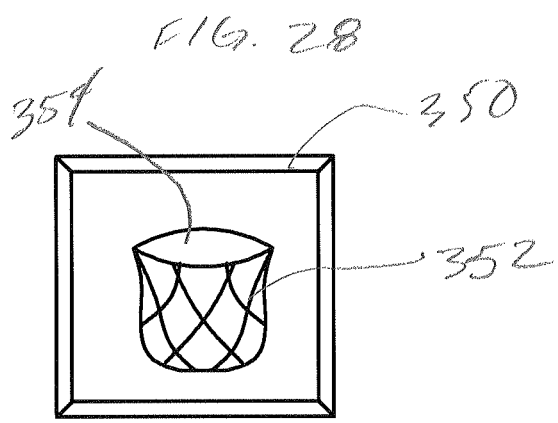

As shown in FIGS. 6 and 40, the user can select a small trash can icon 350 by clicking or using hotkey Ctrl+F1. The icon depicts a small trash can 352 which is filled with an area 354 with the color blue. If the pointing device is held momentarily over any icon, a button hint typically displays. For the icon 350, the hint will display, "Erase the highlighted area completely." Clicking the icon 350 will remove the marked area from the image 260 and return the software to the merged view previously selected. Thus, all marked areas previously highlighted are erased. The Merged view goes back to the normal pale yellow-blue display with any engraved lines shown in black with corresponding white affected areas surrounding each engraved line. Also the small trash can icon 354 previously filled with the color blue has been emptied of the blue color to indicate that software is no longer in the marked area mode. Any time there is a marked area, the blue color area 354 is shown in the trash can 352. Also, the software is configured such that only the merged image view will show marked areas. Marked areas are not visible on the photo view or the scribed view.

In order to help fill areas between engraved lines that may not be completely filled manually by creating individual engraving lines, the software may by selecting the error condensation icon 370 shown in FIG. 6, which is in the form of a curved arrow, or pressing "Ctrl+F2" on a computer keyboard. Error condensation is a special filter algorithm used by the software that is available when the variable line width radio button has been selected for engraving variations in the preferences dialog.

The error condensation filter can be applied to a marked area if a marked area has been identified or to the entire image if no marked area has been identified. The error condensation filter can be applied in various degrees by using the "+" and "−" keys on a computer keyboard and then applied by pressing the "Enter" key. Typically, the user will view the engrave view while determining the level of filtering to apply. The Engraved view is modified in real time as the filter is adjusted so that the user can see the level of error condensation being applied and adjust the error condensation accordingly.

The error condensation filter can be thought of as applying an error diffusion algorithm in reverse. Instead of diffusing the quantization error, as some printers do when printing each pixel, error condensation collects printing errors that would otherwise be made as a result of engraving lines not being present between other nearby engraved lines and including these errors in the "somewhat analog" calculated depth for each point on the engraved lines that are printed. Such small gaps between engraved lines are visible in the merged view where portions of the pale yellow-blue luminescence image are still visible to show the user that the engraved lines and their surrounding affected areas are spaced apart.

Each point on an engraved line can be enlarged or reduced according to values entered in the preferences selections. When a physical scribe is pressed harder into a copper engraving plate, it leaves a deeper and wider indentation. The bigger the indentation in the physical printing plate, the more ink it holds and the bigger the printing mark transferred to the printed media. When using a pen stylus to create engraved lines, the software records the pressure made for each point of the engraved line. These pressure points determine the physical width along the printed engraved line. The recorded pressure of each point is modified when using the error condense filter.

The error condensation algorithm calculates the distance to the nearest point on an engraved line for each pixel in the image. If the distance calculated is within the "error condensation radius limit" entered in the "Pixels Between Traced Lines" field of the preferences dialog, then the pixel is included in a calculation for the pressure to be applied at this nearest point. Points along an engraving line may require a greater pressure if there are no other nearby line points for these condensation errors to accumulate. End points of engraved lines or corners of engraved lines require these error condensation sums to be distributed somewhat towards the interior of the engraved line so as not to create bulbs on the ends of these lines or balloons at the corners of lines. The affect of the errors may also be diminished in the algorithm as the distance increases towards the "error condensation radius limit".

As previously discussed, various settings and parameters of a particular engraved image are controlled in the preferences dialogue box and may be changed by the user. FIG. 32 illustrates a preferences dialogue box 400 according to the present invention. For the each engraved image, a user may change the settings in the preferences dialog box 400. The image file size for the current image displayed (and previously selected by the user) is reported in pixels including the pixels width box and pixels length box.

The output size can also be entered by the user both width (in inches and cm) and length (also in inches and cm). Entering any one of the output size values causes the other values to be calculated based on the pixel aspect ration of the current image displayed. Lines per inch, lines per centimeter, and pixels per line are interrelated and based on the pixels in the image and the output Size. A number entered in any one of these fields will cause the software to calculate the other fields based on the formula: Lines Per Inch=Pixels Width/Output Width/Pixels Per Line. By entering one of these numbers, the user can determine the level of detail in the final output.

When the maximum white width (pixels/line) is set to the same number as pixels per line then the total width (white+black) is a constant and is independent of engraving line variations based on image luminescence, pen pressure or pen tilt. When maximum white width is set to a number greater than the pixels per line, then the white space grows from the value set in pixels per line for the darkest engraving lines to the value set in maximum white width for the lightest engraved lines. The maximum line density coverage determines the maximum line width as expressed by the formula: Maximum Line Width=Pixels Per Line×Maximum Line Density Coverage. Large areas of the darkest printing still require some white space to preserve voids for ink. This number is used to create these white gaps between adjacent engraved lines.

The max/min line width ratio determines the dynamic range of variation allowed for the black line width. In classical engraving, the more engraving pressure that is applied to the scribing tool, the wider the resulting line when printed. The number entered here will determine the ratio of the widest line possible to the narrowest line possible as given by the formula: Ratio=Widest Line/Narrowest Line. The minimum value allowed is 1.0, which means that the black line width is a constant. In this case, the only indication of line variation is visible with the surrounding white width when and if the maximum white width is set to a number greater than Pixels Per Line.

The number entered for pixels between traced lines determines the separation (in pixels) when tracing between parallel lines. The number entered cannot be less than the pixels per line. The number entered here is also used for the error condensation radius limit. As the image is condensed onto the existing engraved lines, only errors within the pixel radius entered here will be condensed onto the existing engraved lines. The Minimum Line Length (in Pixels) determines the minimum length of an engraved line in terms of pixels moved while engraving the line. Engraved lines in the software which are determined to be less than the minimum line length are eliminated. The minimum line length is arbitrarily set to 2 pixels. By the choice of numbers entered in the max/min line width ratio and maximum white width, the user may select either variable (black) line width or variable line separation engraving styles.

The variable line separation engraving style uses a fixed black line width (which is equal to the pixels per line as described above). The white affected area surrounding the fixed black line width varies according to the underlying image, pen pressure, or pen tilt. For the variable line separation engraving style, the max/min line width ratio is set to 1.0 and the maximum white width to a number at least double the pixels per line. The variable line width engraving style uses variations of the black line width to vary within a fixed width white affected area. For the variable line width engraving style, set the max/min line width ratio to a number such as 10.0 and the maximum white width to equal the pixels per line. A combination of these engraving styles may also be used by setting the max/min line width ratio to a number greater than 1.0 and the maximum white width to a number greater than the pixels per line.

If the user changes the pixels per line to a number greater that the pixels between traced lines, the number set forth in the pixels between traced lines box will automatically be changed to the same number.

Figure 33:
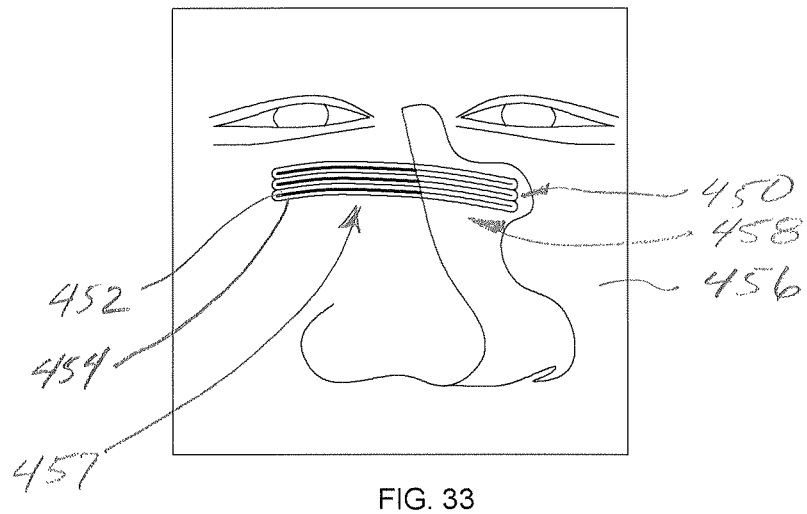
FIGS. 33, 34, 35, 36, 37, 38 and 39 are merged views showing engraved lines over an underlying image to illustrate the effects on lines and trace lines as a function of changes in the preferences dialog box in accordance with the principles of the present invention.
Figure 34:
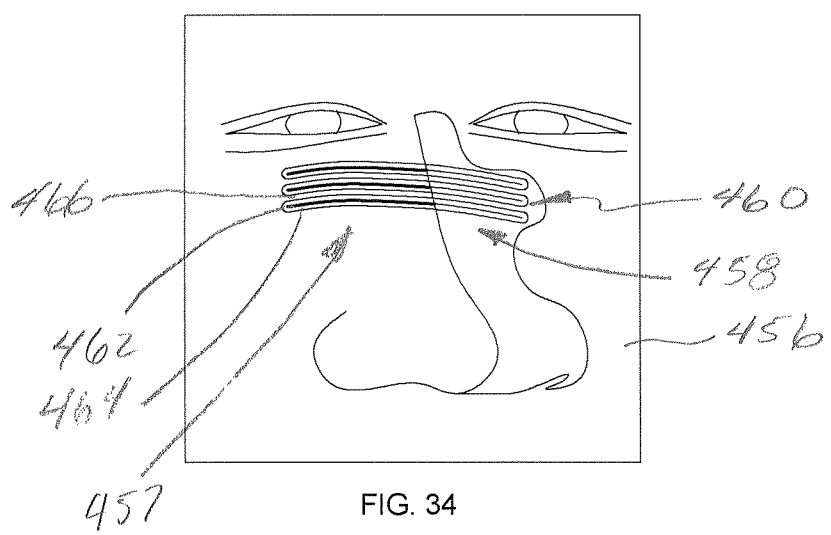
Figure 35:
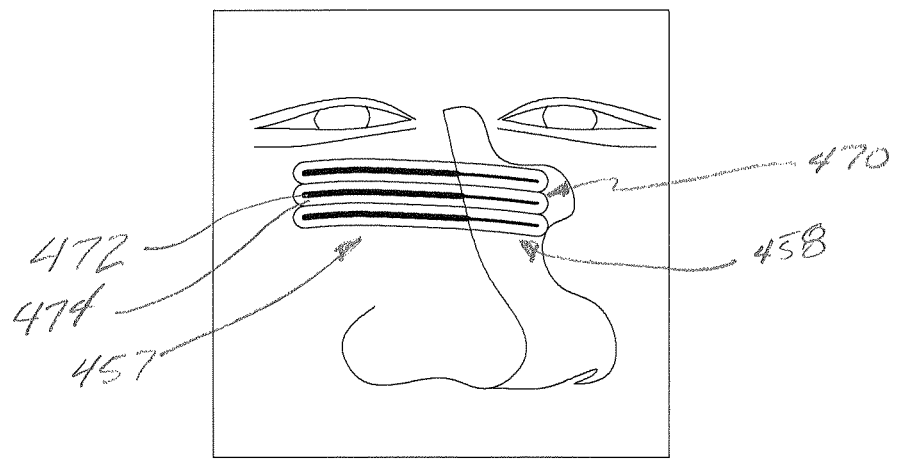

FIGS. 33, 34 and 35 illustrate the effect the line size parameter previously described in the preferences dialog box has on engraved lines 450 that are generated with the software. In FIG. 33, the pixels per line has been set to 6 pixels per line. The maximum white width is set to 6 pixels per line (for a variable line width style), the max/min line width ratio is set to 10.0 (for a variable line width style) and the pixels between traced lines has been set to 6 pixels between traced lines. As shown, each black engraved line 452 is surrounded by a white affected area 454 such that the ratio of white to black in mid shaded areas 457 in the underlying image 456 are approximately equal with the black portions 452 thickening in darker areas 457 and thinning in lighter areas 458. The white affected areas 454 for each line 452 abut one another so that there are no gaps between affected areas and thus no portion of the underlying image 456 showing through the set of trace lines 450.

The set of trace lines 460 in FIG. 34 have been generated with at least one different line parameter in the preferences dialog box. In this example, the pixels per line remains at 6 pixels per line, the maximum white width remains at 6 pixels per line (for variable line width style) and the max/min line width ratio remains at 10.0 (for variable line width style). Pixels between traced lines, however, has been changed to 12 pixels between traced lines. Note how the set of traced lines 460 are each comprised of a black engraved line 462 surrounded by a white affected area 464 with the ratio of white to black in middle shades in the underlying image 456 approximately equal with the black portions 462, the black portions 462 becoming somewhat thicker in darker areas 457 and thinner in lighter areas 458. Because the pixels between traced lines, however, has been increased, gaps 466 are formed between adjacent affected areas such that the underlying image 456 is visible between adjacent engraved lines 460. Essentially this allows the user to create traced lines that have more spacing between lines while maintaining the basic engraved line width.

In FIG. 35, the set of trace lines 470 have been created with the line parameters set with the pixels per line at 20 pixels per line, the maximum white width set at 20 pixels per line (for variable line width style), the max/min line width Ratio set at 10.0 (for variable line width style and the pixels between traced lines set at 20 pixels between traced lines. Accordingly, as in FIGS. 33 and 34, each black engraved line 472 is surrounded by a white affected area 474 such that the ratio of white to black in middle shades in the underlying image 456 are approximately equal with the black portions 472 thickening in darker areas and thinning in lighter areas. Also, the white affected areas 474 for each line 472 abut one another so that there are no gaps between affected areas and thus no portion of the underlying image 456 showing between the set of trace lines 470. The trace lines 470 have increased in width with a corresponding increase in affected area 474. Thus, the resulting engraved image will have a more coarse appearance compared to the engraved image resulting from engraved lines 450 which will have finer detail. At any time during the course of producing the engraved image, the user can access the preferences dialog box and change the line parameters to change the line characteristics, such as changing the overall width of the lines being drawn from thinner lines to thicker lines and back.

In the previous examples shown in FIGS. 33, 34 and 35, the engraved line thickness changed based upon the luminance of the underlying image to create black and white contrasts to recreate the underlying image. Another form of engraving is illustrated in FIGS. 36, 37, 38 and 39 in which the width of all black portions of engraved lines is fixed along the length of each line. The white affected areas, however, and thus the spacing of the black lines, varies according to the underlying image luminance, pen pressure or pen tilt (depending on the current engraving mode) to create variable line separation. The fixed black line width is equal to the pixels per line entered in the preferences dialog box.

Figure 36:
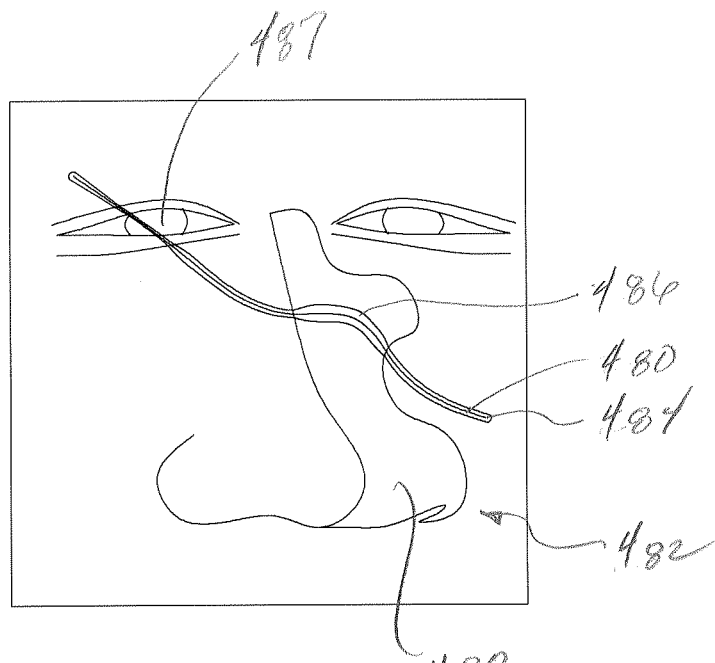

For example, as shown in FIG. 36, the maximum white width has been set to 15, the pixels between traced lines set at 6 and the max/min line width ratio set to 1.0. Using these settings an arbitrary line 480 across the facial image 482 using a luminance (value) based engraving tool. Accordingly, the width of the black portion 484 of the engraving line is fixed. The width of the surrounding white affected area 486 of the engraving line 480 varies. In dark portions 487 of the image, the surrounding white area 486 is narrow. In light portions 488 of the image 482, the surrounding white area 486 is wider.

Figure 37:
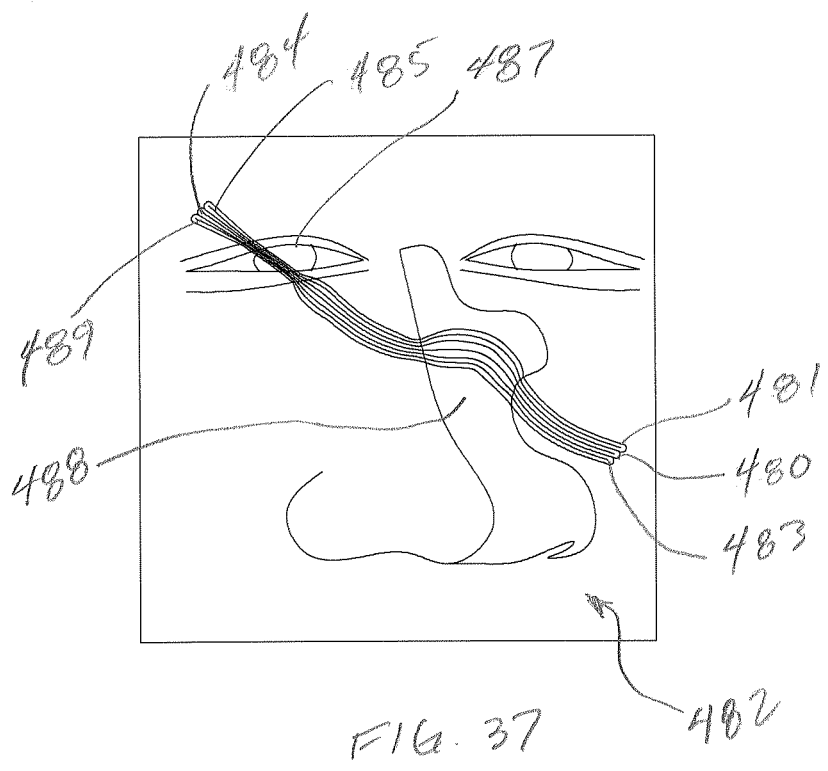

As shown in FIG. 37, employing the use of the trace line tool previously described, a plurality of somewhat parallel lines 480, 481 and 483 can be created, based on the first line 480 shown in FIG. 36. In this mode, the width of the black portions 484, 485 and 489 of all engraving lines 480, 481 and 483, respectively, are fixed in width while the width of the surrounding affected white areas of the engraving lines 480, 481 and 483 vary. Also, the lines 480, 481 and 483 bunch together in the dark portions 487 of the image where the surrounding white areas are narrow. In light portions 488 of the image 482, the surrounding white areas 484, 485 and 487 are wide and the lines 480, 481 and 483 become spread further apart.

Figure 38:
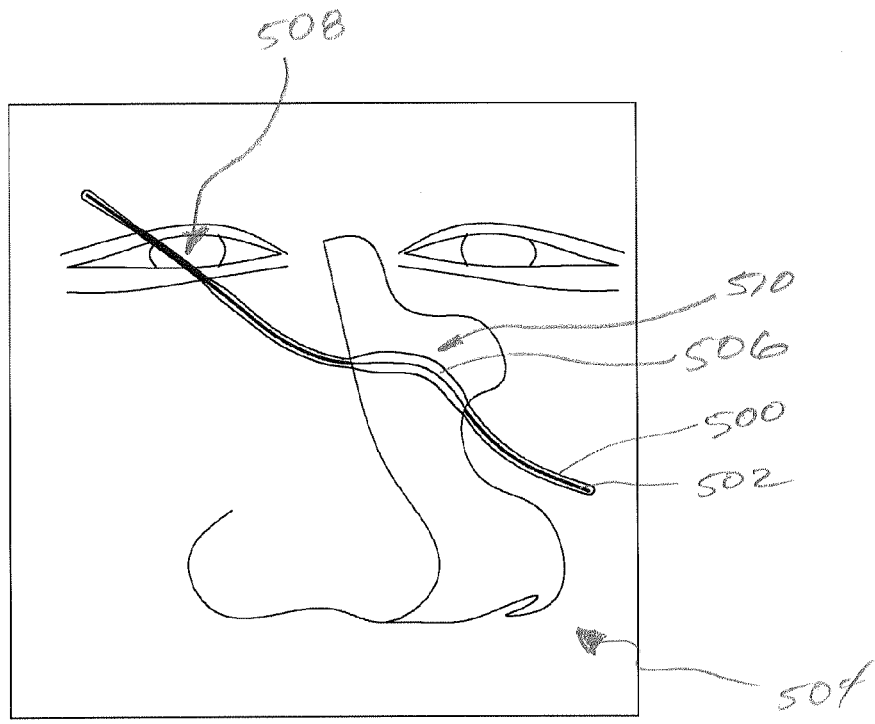

A combination of the variable (black) line width and variable line separation engraving styles may also be used by setting the max/min line width ratio to a number greater than 1.0 and the maximum white width to a number greater than the pixels per line. For example, as shown in FIG. 38, an arbitrary line 500 has been drawn with the following set parameters: the pixels per line is set to 6, the maximum white width is set to 12, the pixels between traced lines set to 6, and the max/min line width ratio set to 5.0. The line 500 is created with a luminance (value) based engraving tool. The width of the black portion 502 of the engraving line 500 is not fixed in width and varies as a function of the underlying image 504 luminescence. In addition, the width of the surrounding white affected area 506 of the engraving line 500 varies. In dark portions 508 of the image 504, the surrounding white area 506 is narrow and the black portion 502 widens. In light portions 510 of the image 504, the surrounding white area 506 widens and the black portion 502 narrows.

Figure 39:
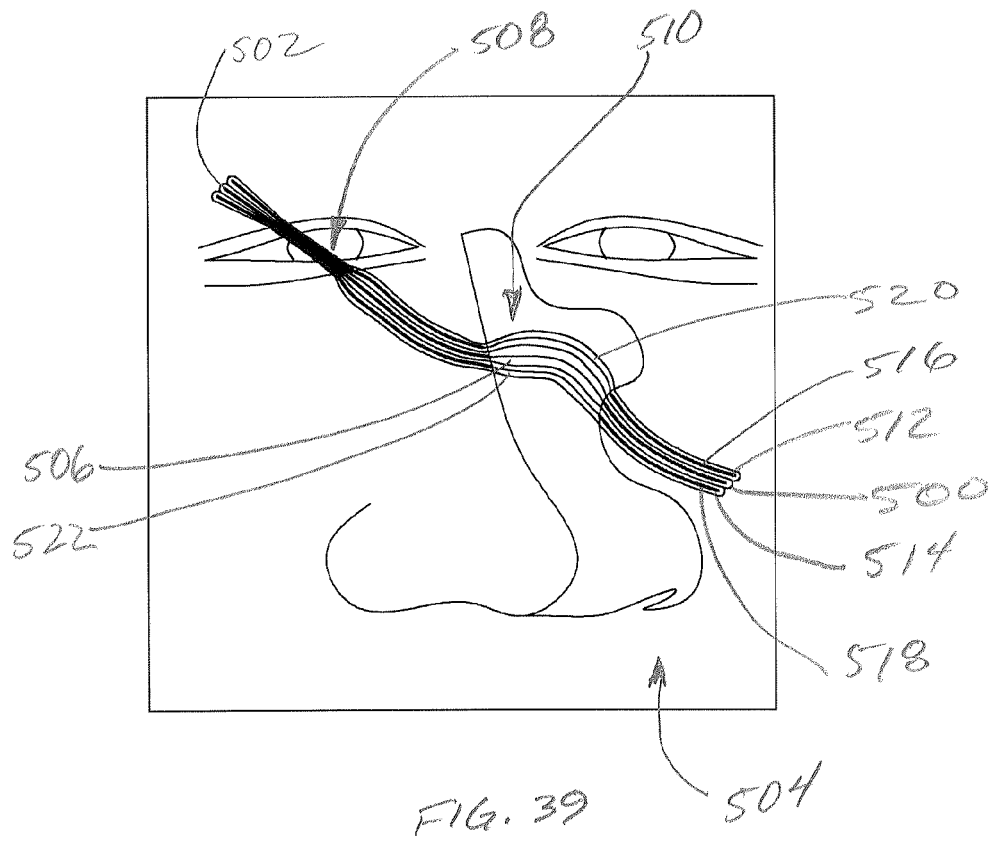

As shown in FIG. 39, using the trace line tool as previously described to create additional lines 512 and 514 that are somewhat parallel to the first line 500, the widths of the black portions 502, 516 and 518 of all engraving lines 500, 512 and 514 varies. In addition, the widths of the surrounding white areas 506, 520 and 522 of the engraving lines 502, 516 and 518 also varies. Thus, the lines 500, 512 and 514 bunch together in the dark portions 508 of the image where the surrounding white areas 506, 520 and 522 are narrow. In lighter portions 510 of the image 504, the surrounding white areas 506, 520 and 522 are wider, the black portions 502, 516 and 518 of the lines 500, 512 and 514 become thinner and are more spread apart.

The software stores the engraved image data in pseudo-vector format. Using a mouse or a pen-tablet, the centerline of the computer-simulated stylus can be saved as engraving marks are made. If a pen-tablet is used, pressure data, tilt angle data or tilt orientation data can be saved corresponding to the x-y location of the scribe mark centerline. A unique number can also be assigned to each scribe line and to each pixel of the scribe-line centerline so that all of the pixels of the scribe line can be grouped together. Because the mouse or pen motion on the software client window surface is a series of x-y data points corresponding to the rasterized image surface, each of these points can be recorded with a number corresponding to the pressure to be applied to the stylus and a unique number corresponding to the scribe line number. From this data and stylus modeling data, the engrave view can be derived. Once the engraved view is derived, the merged view can be derived by combining it with the photo view data. The combination of x-y data, pressure data, and unique line number data are stored in a pressure file. The software stores the pressure data as an RGB bitmapped image. The red channel contains 8 bits (255 distinct levels) of stylus pressure data and the blue and green channels contain 16 bits (65535 unique numbers) of line number data. Pixels which have no line numbers or no pressure data are internally stored as black (R=0x00, G=0x00, B=0x00). Saving the engraved file as pressure data offers some unique advantages. It allows the modeled engraved view and merged view to be regenerated at any point in the design process. In addition, because a small engraved image may have 10,000 lines or more, a single line may be easily removed or edited at any time. Also, a pseudo-vector format can be smoothly enlarged using poly Bézier curves with the raster x-y data. Furthermore, there are many existing vendors of rotary engraving equipment and laser engraving equipment that utilize vector drivers for their equipment that would be compatible with a pseudo-vector format, making the software compatible with existing engraving equipment.

Figure 41:
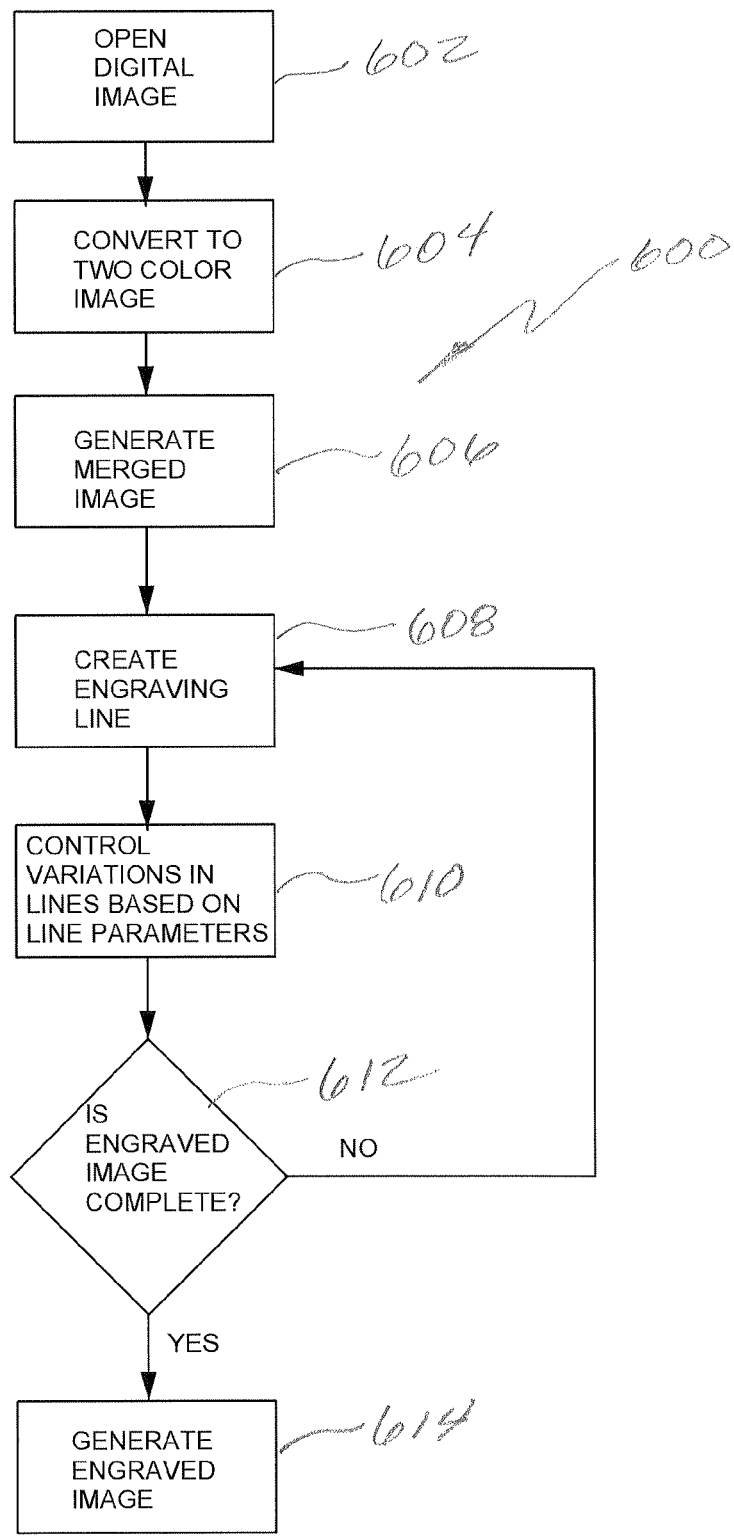
FIG. 41 is a schematic flow diagram of a software program for generating an engraved image in accordance with the principles of the present invention.

FIG. 41 is a schematic flow diagram of the basic process steps of the software, generally indicated at 600, according to the principles of the present invention. In order to produce an engraved image, the software allows the user to open 602 a digital image that can be used as the basis for creating an engraved reproduction of the digital image. The digital image is then converted 604 to a high contract two color image. A merged image is generated 606 to allow the user to create 608 engraving lines in the merged image, which includes the both the two color image and all of the engraving lines that have been created 608. As each engraving line is created 608, the software controls 610 variations in the lines based on the pre-selected line parameters. If the engraved image is complete 612, the engraved image can be generated 614 in its completed form. If not, additional engraving lines can be created 608 until the user is satisfied with the result. The final engraved image can be stored as data for use with existing engraving machines or printed.

Unless defined otherwise, all technical and scientific terms used herein have the same meanings as commonly understood by one of ordinary skill in the art to which this invention belongs. While various methods, steps and systems of the present invention are described herein, any methods, steps and systems similar or equivalent to those described herein may by used in the practice or testing of the present invention. All references cited herein are incorporated by reference in their entirety and for all purposes.

While the foregoing advantages of the present invention are manifested in the illustrated embodiments of the invention, a variety of changes can be made to the configuration, design, implementation and construction of the invention to achieve those advantages. Hence, reference herein to specific details of the process and function of the present invention is by way of example only and not by way of limitation.

What is claimed is:

1. A method of producing a digital representation of an engraved image on a computer monitor, comprising:

allowing a user to independently create a first individual line over an underlying digital image, the first line comprised of a first visible line portion of a first color surrounded by a first affected area portion of a second color, the first affected area portion defining a first area around the first visible line portion that extends around both sides of the second visible line portion, a width of at least one of the first visible line portion and the first affected area portion of the first line being automatically affected by a luminance of the underlying digital image according to preselected parameters that vary the width of at least one of the first visible line portion and the first affected area portion;

allowing a user to independently create a second individual line proximate to the first line, the second line comprised of a second visible line portion of the first color surrounded by a second affected area portion of the second color, the second affected area portion defining a second area around the second visible line portion that extends around both sides of the second visible line portion, a width of at least one of the second visible line portion and the second affected area portion of the second line being automatically affected by a luminance of the underlying digital image according to preselected parameters that vary the width of at least one of the second visible line portion and the second affected area portion;

controlling the spacing between the first and second visible line portions by varying at least one of the width of the first and second visible line portions according to the luminance of the underlying digital image and the width of the first and second affected area portions according to the luminance of the underlying digital image; and preventing the first and second affected areas in a first engraving mode from overlapping by abutting the first and second affected areas of the first and second lines to control the spacing of the first and second visible line portions according to a user selected width of the first and second affected areas to form a digital engraving of the underlying digital image according to the luminance of the underlying digital image.

2. The method of claim 1, further comprising automatically adjusting the position of the second line created by the user to be substantially parallel to the first line.

3. The method of claim 1, further comprising allowing the user to create a third line adjacent and substantially parallel to the first line and on an opposite side of said second line, the third line comprised of a third visible line portion surrounded by a third affected area, and preventing the first and third affected areas from overlapping by abutting the first and third affected areas of the first and third lines to control the spacing of the first and third visible line portions according to a user selected width of the first, second and third affected areas to form a digital engraving of the underlying digital image according to the luminance of the underlying digital image.

4. The method of claim 3, further comprising providing the first, second and third affected areas with a constant width along their respective lengths and wherein the first, second and third affected areas abut one another along their length so that there are no gaps between adjacent affected areas and further comprising varying widths of the first, second and third visible line portions according to the luminance of the underlying digital image to form a digital engraving of the underlying digital image.

5. The method of claim 1, wherein allowing the user to create the second line further comprises crossing said second line over said first line.

6. The method of claim 5, wherein crossing comprises in a second engraving mode combining the first and second lines so that the second visible line portion of the second line appears to be integrated with the first visible line portion of the said first line and the first affected area of the first line is combined with the second affected area of the second line.

7. The method of claim 6, wherein crossing comprises in a third engraving mode dividing the first line into two line segments at the intersection of the first and second lines and reforming the first affected area so that the second line maintains the substantially uniform spacing from two line segments.

8. The method of claim 7, further comprising allowing the user to select and delete the second line without affecting the properties of the two line segments.

9. The method of claim 1, further comprising allowing a user to delete at least one portion of the first line and automatically reforming the remaining line segment of the first line with a visible line portion surrounded by an associated affected area.

10. The method of claim 1, further comprising opening a digital image to form a basis of a digitally engraved image.

11. The method of claim 10, further comprising automatically controlling variations in the first and second lines to change properties in the first and second lines depending on the luminance of the underlying digital image and user selected parameters of the first and second lines as the first and second lines are individually drawn by the user.

12. The method of claim 11, wherein the controlling variations comprises automatically changing a width of the visible line portion of the first and second lines wherein the width is greater in darker areas and thinner in lighter areas.

13. The method of claim 11, wherein the controlling variations comprises automatically changing a visible line portion width of the first and second lines wherein the visible line portion width is greater in darker areas and thinner in lighter areas and changing an affected area width of each of the first and second lines wherein the affected area width is greater in lighter areas and thinner in darker areas.

14. The method of claim 11, wherein the controlling variations comprises automatically changing an affected area width of each of the first and second lines wherein the affected area width is greater in lighter areas and thinner in darker areas, while maintaining a uniform thickness of the first and second lines.

15. The method of claim 1, further comprising receiving data from a pen stylus and tablet to create the first and second lines wherein at least one of pressure and tilt of the pen stylus controls at least one of a visible line width and an affected area width.

16. The method of claim 10, further comprising converting the digital image into a two color image based on the luminance of the digital image, the two color image comprising pixels of a first lighter color and pixels of a second contrasting darker color other than black and white, wherein lighter areas contain proportionately more pixels of the first color and darker areas contain proportionately more pixels of the second color.

17. The method of claim 16, wherein converting the digital image into a two color image includes employing yellow for a first color and blue for a second color.

18. The method of claim 16, further comprising creating a marked area on the two color image to provide a defined area within which the first and second lines can only be drawn.

19. The method of claim 11, wherein controlling variations includes controlling the width of the first and second lines such that a width of each of said first and second lines varies along their respective lengths.

20. The method of claim 11, wherein controlling variations includes varying the width of said first and second lines based on the luminance of the digital image over which the first and second lines are created.

* * * * *